United States Patent
Xu

(10) Patent No.: US 12,556,809 B2
(45) Date of Patent: Feb. 17, 2026

(54) SHOOTING METHOD AND RELATED DEVICE

(71) Applicant: Honor Device Co., Ltd., Shenzhen (CN)

(72) Inventor: Jirun Xu, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 191 days.

(21) Appl. No.: 18/262,483

(22) PCT Filed: Dec. 29, 2022

(86) PCT No.: PCT/CN2022/143188
§ 371 (c)(1),
(2) Date: Jul. 21, 2023

(87) PCT Pub. No.: WO2023/160230
PCT Pub. Date: Aug. 31, 2023

(65) Prior Publication Data
US 2024/0397199 A1  Nov. 28, 2024

(30) Foreign Application Priority Data
Feb. 28, 2022 (CN) .......................... 202210190083.X

(51) Int. Cl.
*H04N 23/60* (2023.01)
*G06T 5/50* (2006.01)
(Continued)

(52) U.S. Cl.
CPC .............. *H04N 23/64* (2023.01); *G06T 5/50* (2013.01); *H04N 23/62* (2023.01);
(Continued)

(58) Field of Classification Search
None
See application file for complete search history.

(56) References Cited

U.S. PATENT DOCUMENTS

| 7,515,820 | B2 | 4/2009 | Nakai et al. |
| 11,070,743 | B2 | 7/2021 | Sun et al. |
| 2020/0267295 | A1* | 8/2020 | Lee .......................... H04N 23/45 |

FOREIGN PATENT DOCUMENTS

| CN | 101112079 A | 1/2008 |
| CN | 107302664 A | 10/2017 |

(Continued)

OTHER PUBLICATIONS

English translation of WO-2023056795-A1, Sun, 2023 (Year: 2023).*
English translation of CN-107613216-B, Li, 2019 (Year: 2019).*

*Primary Examiner* — James M Hannett
(74) *Attorney, Agent, or Firm* — Conley Rose, P.C.

(57) ABSTRACT

A shooting method and a related device. According to the shooting method, a camera application in an electronic device may send an instruction of shooting in advance through a custom interface when a user taps a shutter control. The electronic device may determine a current 3A state based on the instruction of shooting. If the current 3A state is a 3A lock state, the electronic device obtains an image frame. In the foregoing process, the electronic device may further capture a variable exposure frame in advance, and obtain an image in a buffered frame queue based on address information and a reference count of the image. The electronic device may not only increase a shooting response speed of the electronic device, but also select a clearer image for fusion more accurately. This increases definition of a shot image and improves shooting experience of the user.

20 Claims, 12 Drawing Sheets

(51) Int. Cl.
*H04N 23/62* (2023.01)
*H04N 23/63* (2023.01)

(52) U.S. Cl.
CPC ....... *H04N 23/633* (2023.01); *G06T 2200/24* (2013.01); *G06T 2207/10144* (2013.01); *G06T 2207/20221* (2013.01)

(56) References Cited

FOREIGN PATENT DOCUMENTS

| | | | | |
|---|---|---|---|---|
| CN | 107509034 | A | 12/2017 | |
| CN | 108900779 | A | 11/2018 | |
| CN | 109496425 | A | 3/2019 | |
| CN | 109922322 | A | 6/2019 | |
| CN | 110072061 | A | 7/2019 | |
| CN | 110213502 | A | 9/2019 | |
| CN | 107613216 | B * | 10/2019 | |
| CN | 112532859 | A | 3/2021 | |
| CN | 112672046 | A | 4/2021 | |
| CN | 113497879 | A | 10/2021 | |
| CN | 113727018 | A | 11/2021 | |
| JP | 2006129065 | A | 5/2006 | |
| TW | 200408266 | A | 5/2004 | |
| WO | WO-2023056795 | A1 * | 4/2023 | ............. H04N 23/67 |

* cited by examiner

S301: An electronic device displays a user interface A. The user interface A is a shooting user interface of a camera application. The camera application is an application in the electronic device. The user interface A includes a shutter control S302: The electronic device detects that a user taps the shutter control, and the camera application in the electronic device generates an instruction of shooting in advance in response to an operation of tapping the shutter control. The instruction of shooting in advance is used for triggering a shooting process in advance S303: The camera application in the electronic device sends the instruction of shooting in advance to a HAL layer through an interface X S304: A camera HAL module in the HAL layer in the electronic device determines a current 3A state after receiving the instruction of shooting in advance S305: If the 3A state is a 3A lock state, the camera HAL module in the electronic device obtains an image i from a buffered frame queue based on a time when the user triggers the shutter control. A time when the electronic device captures the image i by using a camera lens is the same as the time when the user triggers the shutter control. The image i is a RAW image. The buffered frame queue is used for storing the RAW image captured by the camera lens

SHOOTING METHOD AND RELATED DEVICE

CROSS-REFERENCE TO RELATED APPLICATIONS

This application is a U.S. National Stage of International Application No. PCT/CN2022/143188, filed on Dec. 29, 2022, which claims priority to Chinese Patent Application No. 202210190083.X, filed with the China National Intellectual Property Administration on Feb. 28, 2022, both of which are incorporated herein by reference in their entireties.

TECHNICAL FIELD

This application relates to the field of terminal technologies, and in particular to a shooting method and a related device.

BACKGROUND

During shooting, after a user taps a shutter control, a camera application in an electronic device begins to send an instruction to a hardware abstraction layer, to view a convergence state of a 3A algorithm. Only after receiving prompt information of convergence of the 3A algorithm reported by the hardware abstraction layer, the camera application sends a shooting command, and a related module of the hardware abstraction layer starts frame selection, frame capturing, and post processing, to transmit an image obtained by shooting this time to the camera application, for the user to view:

It may be understood that, during the shooting, the camera application is to interact with the hardware abstraction layer for a plurality of times, and the related module of the hardware abstraction layer is to process the image for a plurality of times, leading to a relatively long time to be required from shutter triggering to completion of photo shooting. That is, a shooting response time of the electronic device is relatively long and a shooting response speed is relatively slow, affecting shooting experience of the user.

Therefore, how to increase the shooting response speed of the electronic device is to be resolved urgently at present.

SUMMARY

This application provides a shooting method and a related device. According to the shooting method, when detecting that a user taps a shutter, an electronic device may send an instruction of shooting in advance by using a camera application. Once a camera HAL module in the electronic device receives the instruction of shooting in advance and determines that a current 3A state is a 3A lock state, the electronic device may obtain an image frame. It may be understood that the image frame is an image obtained by shooting this time. In this manner, the electronic device may send a shooting request in advance, and it is not required that the camera application and the camera HAL module in the electronic device interact with each other for a plurality of times. This reduces time used, and increases a shooting response speed of the electronic device, so that the user can obtain a shot image more quickly, that is, shooting experience of the user is improved.

According to a first aspect, this application provides a shooting method. The method may be applied to an electronic device. This method may include: The electronic device displays a first user interface, where the first user interface includes a shutter control; the first user interface is a shooting user interface of a camera application; when detecting an operation of tapping the shutter control, the electronic device generates an instruction of shooting in advance in response to the operation of tapping the shutter control; and the electronic device determines a current 3A state based on the instruction of shooting in advance, and obtains an image frame if the current 3A state is a 3A lock state, where the 3A state is used for indicating a performing progress of a 3A algorithm; and the 3A lock state indicates that the 3A algorithm has converged.

In the solution provided in this application, the user may tap the shutter control to trigger shooting. When the user taps the shutter control, the electronic device may detect the operation of tapping the shutter control and generate the instruction of shooting in advance. The electronic device may determine the current 3A state based on the instruction of shooting in advance. If the current 3A state is the 3A lock state, the electronic device may obtain the image frame this time. In this manner, the electronic device triggers a shooting process in advance, and the current 3A state is not required to be uploaded to the camera application. This reduces a time of interaction between the camera application and the HAL layer, increases a shooting response speed of the electronic device, to enable the user to obtain an image more quickly after tapping a shutter, improving shooting experience of the user.

It may be understood that, when the electronic device detects the operation of tapping a shutter, the user has not released the shutter control.

In some embodiments of this application, an image frame (that is, an image obtained by shooting this time) finally obtained by the electronic device is an image I.

In some embodiments of this application, an image frame (that is, an image obtained by shooting this time) finally obtained by the electronic device is an image K.

It may be understood that, for related descriptions of a shooting parameter and 3A, reference may be made to an embodiment described later. Details are not described herein.

In some embodiments of this application, the first user interface is a user interface A.

With reference to the first aspect, in a possible implementation of the first aspect, after generating the instruction of shooting in advance, the method further includes: The electronic device sends the instruction of shooting in advance to a hardware abstraction layer HAL based on a first interface by using the camera application, where the first interface is a custom interface.

In the solution provided in this application, the camera application in the electronic device sends the instruction of shooting in advance through a custom interface (that is, the foregoing first interface). The instruction of shooting in advance triggers a shooting process in advance and increases a shooting response speed of the electronic device.

In some embodiments of this application, the first interface is an interface X in an embodiment described later.

With reference to the first aspect, in a possible implementation of the first aspect, the obtaining an image frame specifically includes: The electronic device selects N frames of images from a buffered frame queue based on a first time and a jitter amount and sharpness of the images in the buffered frame queue, where the first time is a time point at which the electronic device detects the operation of tapping the shutter control; the buffered frame queue is used for storing an image captured by the electronic device by using a camera lens; the N frames of images are original RAW images; and N is a positive integer; and the electronic device performs post processing on the N frames of images, to obtain the image frame.

In the solution provided in this application, after determining that the current 3A state is the 3A lock state, the electronic device may select the N frames of images from the buffered frame queue for subsequent post processing. It may be understood that the electronic device may select the N frames of images from the buffered frame queue based on the first time and the jitter amount and sharpness of the images in the buffered frame queue. In some embodiments of this application, the first time may be a time point at which the user taps the shutter control mentioned in an embodiment described later. It may be understood that, for a specific manner in which the electronic device selects the N frames of images, reference may be made to an embodiment described later. Details are not described herein.

With reference to the first aspect, in a possible implementation of the first aspect, before that the electronic device performs post processing on the N frames of images, the method further includes: Before sending a to-be-sent shooting parameter, the electronic device sends a variable exposure shooting parameter to the camera lens by using a camera HAL module and captures a group of variable exposure frames based on the variable exposure shooting parameter by using the camera lens, where the to-be-sent shooting parameter is a shooting parameter obtained by the camera HAL module before obtaining the variable exposure shooting parameter and not yet sent to the camera lens; the variable exposure shooting parameter includes exposure parameters corresponding to the group of variable exposure frames; and an exposure time corresponding to images in the group of variable exposure frames is different; and that the electronic device performs post processing on the N frames of images includes: The electronic device fuses the N frames of images with the group of variable exposure frames.

In the solution provided in this application, before sending a shooting parameter (such as the foregoing variable exposure shooting parameter) required for shooting this time, the electronic device is to continually send a shooting parameter required for capturing a previewed image to the camera lens. After the camera HAL module in the electronic device obtains the variable exposure shooting parameter, there is still a to-be-sent shooting parameter (that is, the to-be-sent shooting parameter) that is obtained before the variable exposure shooting parameter is obtained. The camera HAL module may queue the variable exposure shooting parameter in front of the to-be-sent shooting parameter, so that the camera HAL module sends the variable exposure shooting parameter in advance. This means that a time point at which the electronic device obtains a variable exposure frame is shortened. Correspondingly, a time point at which the electronic device performs post processing is also shortened, and then a time point at which an image is shot this time is also shortened. In this manner, a shooting process is accelerated, a shooting response speed of the electronic device is increased, and shooting experience of the user is also improved. In addition, a time difference between a time point at which the variable exposure frame is generated and a time point at which the N frames of images are selected from the buffered queue is shortened, facilitating subsequent fusion and obtaining a clearer image frame.

With reference to the first aspect, in a possible implementation of the first aspect, before that the electronic device performs post processing on the N frames of images, the method further includes: The electronic device adds address information to the images in the buffered frame queue; the electronic device records address information corresponding to the N frames of images, and adds 1 to a reference count corresponding to the N frames of images, where the reference count is a quantity of times for which the corresponding images are about to be invoked or being invoked; and the images that are about to be invoked or being invoked for times not equal to 0 are not eliminated after being moved out of the buffered frame queue; and the electronic device obtains the N frames of images based on the address information corresponding to the N frames of images.

In the solution provided in this application, the electronic device may obtain the images in the buffered frame queue by using the address information and the reference count of the images in the queue for post processing. Specifically, the electronic device is not required to copy the image in the queue, but adds 1 to the reference count, and then find corresponding images by using the address information. It may be understood that an image with a reference count not being 0 is not eliminated after being moved out of the buffered frame queue. In the foregoing manner, a large amount of time for copying and computing resources are reduced, a shooting process is accelerated, and a shooting response speed of the electronic device is increased.

With reference to the first aspect, in a possible implementation of the first aspect, the one group of variable exposure frames include a short exposure frame, a medium exposure frame, and a long exposure frame. An exposure time corresponding to the short exposure frame is less than an exposure time corresponding to the medium exposure frame. An exposure time corresponding to the medium exposure frame is less than an exposure time corresponding to the long exposure frame.

With reference to the first aspect, in a possible implementation of the first aspect, after the electronic device generates the instruction of shooting in advance by using the camera application, the method further includes: The electronic device detects an operation of shutter releasing.

With reference to the first aspect, in a possible implementation of the first aspect, after the obtaining an image frame, the method further includes: The electronic device displays a second user interface. The second user interface includes a gallery shortcut control. The gallery shortcut control displays a thumbnail of the image frame.

In some embodiments of this application, the second user interface is a user interface B.

According to a second aspect, this application provides an electronic device. The electronic device may include a display; a memory; and one or more processors. The memory may store a computer program, and the processor may invoke the computer program. Specifically; the display may be configured to display a first user interface. The first user interface includes a shutter control. The first user interface is a shooting user interface of a camera application. The processor is configured to: when detecting an operation of tapping the shutter control, generate an instruction of shooting in advance in response to the operation of tapping the shutter control; and determine a current 3A state based on the instruction of shooting in advance, and obtain an image frame if the current 3A state is a 3A lock state. The 3A state is used for indicating a performing progress of a 3A algorithm. The 3A lock state indicates that the 3A algorithm has converged.

With reference to the second aspect, in a possible implementation of the second aspect, after being configured to generate the instruction of shooting in advance, the processor may be configured to: send the instruction of shooting in advance to a hardware abstraction layer HAL based on a first interface by using the camera application. The first interface is a custom interface.

With reference to the second aspect, in a possible implementation of the second aspect, when the processor is configured to obtain the image frame, the processor is specifically configured to: select N frames of images from a buffered frame queue based on a first time and a jitter amount and sharpness of the images in the buffered frame queue, where the first time is a time point at which the electronic device detects the operation of tapping the shutter control; the buffered frame queue is used for storing an image captured by the electronic device by using a camera lens; the N frames of images are original RAW images; and N is a positive integer; and perform post processing on the N frames of images, to obtain the image frame.

With reference to the second aspect, in a possible implementation of the second aspect, before the processor is configured to perform post processing on the N frames of image, the processor is further configured to: before sending a to-be-sent shooting parameter, send a variable exposure shooting parameter to the camera lens by using a camera HAL module. The electronic device may include a camera lens. The camera lens may be configured to capture a group of variable exposure frames based on the variable exposure shooting parameter. The to-be-sent shooting parameter is a shooting parameter obtained by the camera HAL module before obtaining the variable exposure shooting parameter and not yet sent to the camera lens. The variable exposure shooting parameter includes exposure parameters corresponding to the group of variable exposure frames. An exposure time corresponding to images in the group of variable exposure frames is different. When the processor is configured to perform post processing on the N frames of images, the processor is specifically configured to fuse the N frames of images with the group of variable exposure frames.

With reference to the second aspect, in a possible implementation of the second aspect, before the processor is configured to perform post processing on the N frames of image, the processor is further configured to: add address information to the images in the buffered frame queue; record address information corresponding to the N frames of images, and add 1 to a reference count corresponding to the N frames of images, where the reference count is a quantity of times for which the corresponding images are about to be invoked or being invoked; and the images that are about to be invoked or being invoked for times not equal to 0) are not eliminated after being moved out of the buffered frame queue; and obtain the N frames of images based on the address information corresponding to the N frames of images.

With reference to the second aspect, in a possible implementation of the second aspect, the one group of variable exposure frames include a short exposure frame, a medium exposure frame, and a long exposure frame. An exposure time corresponding to the short exposure frame is less than an exposure time corresponding to the medium exposure frame. An exposure time corresponding to the medium exposure frame is less than an exposure time corresponding to the long exposure frame.

With reference to the second aspect, in a possible implementation of the second aspect, after being configured to generate the instruction of shooting in advance by using the camera application, the processor is further configured to detect an operation of shutter releasing.

With reference to the second aspect, in a possible implementation of the second aspect, after the processor is configured to obtain the image frame, the display is further configured to display a second user interface. The second user interface includes a gallery shortcut control. The gallery shortcut control displays a thumbnail of the image frame.

According to a third aspect, this application provides a shooting method. The method may be applied to an electronic device. The method may include: The electronic device displays a first user interface, where the first user interface includes a shutter control; and the first user interface is a shooting user interface of a camera application: the electronic device detects a first operation acting on the shutter control, and determines a current 3A state in response to the first operation; if the current 3A state is a 3A lock state, before sending a to-be-sent shooting parameter, the electronic device sends a variable exposure shooting parameter to a camera lens by using a camera HAL module and captures a group of variable exposure frames based on the variable exposure shooting parameter by using the camera lens; and the electronic device selects N frames of images from a buffered frame queue, and performs post processing on the group of variable exposure frames and the N frames of images, to obtain an image frame. The 3A state is used for indicating a performing progress of a 3A algorithm. The 3A lock state indicates that the 3A algorithm has converged. The to-be-sent shooting parameter is a shooting parameter obtained by the camera HAL module before obtaining the variable exposure shooting parameter and not yet sent to the camera lens. The variable exposure shooting parameter includes exposure parameters corresponding to the group of variable exposure frames. An exposure time corresponding to images in the group of variable exposure frames is different. The buffered frame queue is used for storing an image captured by the electronic device by using the camera lens; and N is a positive integer.

With reference to the third aspect, in a possible implementation of the third aspect, before performing post processing on the group of variable exposure frames and the N frames of images, the method further includes: The electronic device adds address information to the images in the buffered frame queue; the electronic device records address information corresponding to the N frames of images, and adds 1 to a reference count corresponding to the N frames of images, where the reference count is a quantity of times for which the corresponding images are about to be invoked or being invoked; and the images that are about to be invoked or being invoked for times not equal to 0) are not eliminated after being moved out of the buffered frame queue; and the electronic device obtains the N frames of images based on the address information corresponding to the N frames of images.

According to a fourth aspect, this application provides an electronic device. The electronic device may include a display, a camera lens, a memory; and one or more processors. The memory may store a computer program, and the processor may invoke the computer program. Specifically; the display may be configured to display a first user interface. The first user interface includes a shutter control; and the first user interface is a shooting user interface of a camera application. The processor may be configured to: detect a first operation acting on the shutter control, and determine a current 3A state in response to the first operation; and if the current 3A state is a 3A lock state, before sending a to-be-sent shooting parameter, send a variable exposure shooting parameter to the camera lens by using a camera HAL module. The camera lens may be configured to capture a group of variable exposure frames based on the variable exposure shooting parameter. The processor may be further configured to select N frames of images from a buffered frame queue, and perform post processing on the group of variable exposure frames and the N frames of images, to obtain an image frame. The 3A state is used for indicating a performing progress of a 3A algorithm. The 3A lock state indicates that the 3A algorithm has converged. The to-be-sent shooting parameter is a shooting parameter obtained by the camera HAL module before obtaining the variable exposure shooting parameter and not yet sent to the camera lens. The variable exposure shooting parameter includes exposure parameters corresponding to the group of variable exposure frames. An exposure time corresponding to images in the group of variable exposure frames is different. The buffered frame queue is used for storing an image captured by the electronic device by using the camera lens; and N is a positive integer.

With reference to the fourth aspect, in a possible implementation of the fourth aspect, before being configured to perform post processing on the group of variable exposure frames and the N frames of images, the processor is further configured to: add address information to the images in the buffered frame queue; record address information corresponding to the N frames of images, and add 1 to a reference count corresponding to the N frames of images, where the reference count is a quantity of times for which the corresponding images are about to be invoked or being invoked; and the images that are about to be invoked or being invoked for times not equal to 0) are not eliminated after being moved out of the buffered frame queue; and obtain the N frames of images based on the address information corresponding to the N frames of images.

According to a fifth aspect, this application provides a shooting method. The method may be applied to an electronic device. The method may include: The electronic device displays a first user interface, where the first user interface includes a shutter control; and the first user interface is a shooting user interface of a camera application: the electronic device detects a first operation acting on the shutter control, and determines a current 3A state in response to the first operation: the electronic device adds address information to the images in the buffered frame queue if the current 3A state is a 3A lock state; the electronic device selects N frames of images from the buffered frame queue, records address information corresponding to the N frames of images, and adds 1 to a reference count corresponding to the N frames of images, where the reference count is a quantity of times for which the corresponding images are about to be invoked or being invoked; and the images that are about to be invoked or being invoked for times not equal to 0 are not eliminated after being moved out of the buffered frame queue; and the buffered frame queue is used for storing an image captured by the electronic device by using a camera lens; and N is a positive integer; and the electronic device obtains the N frames of images based on the address information corresponding to the N frames of images, and performs post processing on the N frames of images, to obtain an image frame.

According to a sixth aspect, this application provides an electronic device. The electronic device may include a display; a memory; and one or more processors. The memory may store a computer program, and the processor may invoke the computer program. Specifically, the display may be configured to display a first user interface. The first user interface includes a shutter control; and the first user interface is a shooting user interface of a camera application.

The processor may be configured to: detect a first operation acting on the shutter control, and determine a current 3A state in response to the first operation; and add address information to the images in the buffered frame queue if the current 3A state is a 3A lock state; select N frames of images from the buffered frame queue, record address information corresponding to the N frames of images, and add 1 to a reference count corresponding to the N frames of images, where the reference count is a quantity of times for which the corresponding images are about to be invoked or being invoked; and the images that are about to be invoked or being invoked for times not equal to 0) are not eliminated after being moved out of the buffered frame queue; and the buffered frame queue is used for storing an image captured by the electronic device by using a camera lens; and N is a positive integer; and obtain the N frames of images based on the address information corresponding to the N frames of images, and perform post processing on the N frames of images, to obtain an image frame.

According to a seventh aspect, this application provides a computer storage medium including instructions. When the instructions are run on an electronic device, the electronic device is enabled to perform any one of the possible implementations in the first aspect.

According to an eighth aspect, this application provides a computer storage medium including instructions. When the instructions are run on an electronic device, the electronic device is enabled to perform any one of the possible implementations in the third aspect.

According to a ninth aspect, this application provides a computer storage medium including instructions. When the instructions are run on an electronic device, the electronic device is enabled to perform any one of the possible implementations in the fifth aspect.

According to a tenth aspect, an embodiment of this application provides a chip. The chip is used in an electronic device. The chip includes one or more processors. The processor is configured to invoke computer instructions to enable the electronic device to perform any one of the possible implementations in the first aspect.

According to an eleventh aspect, an embodiment of this application provides a chip. The chip is used in an electronic device. The chip includes one or more processors. The processor is configured to invoke computer instructions to enable the electronic device to perform any one of the possible implementations in the third aspect.

According to a twelfth aspect, an embodiment of this application provides a chip. The chip is used in an electronic device. The chip includes one or more processors. The processor is configured to invoke computer instructions to enable the electronic device to perform any one of the possible implementations in the fifth aspect.

According to a thirteenth aspect, an embodiment of this application provides a computer program product including instructions. When the computer program product is run on an electronic device, the electronic device is enabled to perform any one of the possible implementations in the first aspect.

According to a fourteenth aspect, an embodiment of this application provides a computer program product including instructions. When the computer program product is run on an electronic device, the electronic device is enabled to perform any one of the possible implementations in the third aspect.

According to a fifteenth aspect, an embodiment of this application provides a computer program product including instructions. When the computer program product is run on an electronic device, the electronic device is enabled to perform any one of the possible implementations in the fifth aspect.

It may be understood that the electronic device provided in the second aspect, the computer storage medium provided in the seventh aspect, the chip provided in the tenth aspect, and the computer program product provided in the thirteenth aspect are all configured to perform any one of the possible implementations in the first aspect. Therefore, for beneficial effects that can be achieved, reference may be made to the beneficial effects in any one of the possible implementations in the first aspect. The details are not described herein again.

In addition, the electronic device provided in the fourth aspect, the computer storage medium provided in the eighth aspect, the chip provided in the eleventh aspect, and the computer program product provided in the fourteenth aspect are all configured to perform any one of the possible implementations in the second aspect. The electronic device provided in the sixth aspect, the computer storage medium provided in the ninth aspect, the chip provided in the twelfth aspect, and the computer program product provided in the fifteenth aspect are all configured to perform any one of the possible implementations in the second aspect. For corresponding beneficial effects, reference may be made to embodiments described later. Details are not described herein.

BRIEF DESCRIPTION OF DRAWINGS

FIG. 3A and FIG. 3B are a flowchart of a shooting method according to an embodiment of this application:

DESCRIPTION OF EMBODIMENTS

Figure 1:
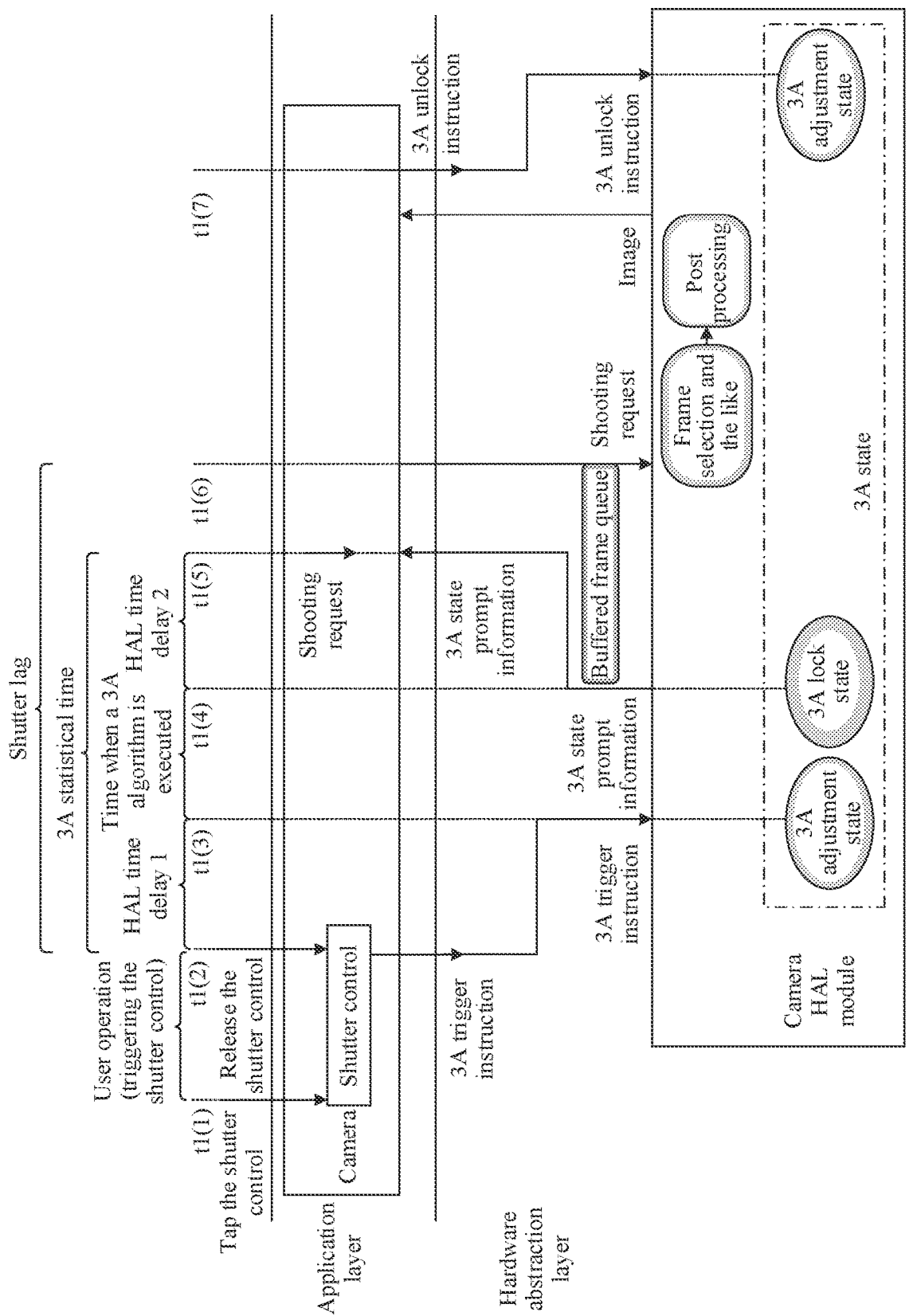
FIG. 1 is a schematic diagram of a shooting method according to an embodiment of this application.

The following clearly describes technical solutions in embodiments of this application with reference to the accompanying drawings in embodiments of this application. In the descriptions of embodiments of this application, unless otherwise specified, "/" indicates "or". For example, A/B may indicate A or B. The term "and/or" in this specification only describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

It should be understood that, in this specification, claims, and accompanying drawings of this application, terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this application means that a particular characteristic, structure, or feature described with reference to embodiments may be included in at least one embodiment of this application. The phrase shown in various locations in this specification may not necessarily mean a same embodiment, and is not an independent or optional embodiment exclusive from another embodiment. It is explicitly and implicitly understood by persons skilled in the art that embodiments described in this application may be combined with another embodiment.

With the progress and development of science and technology; functions that can be achieved by electronic devices such as mobile phones are becoming increasingly powerful. During shooting, most electronic devices can achieve auto focus, automatic adjustment of an exposure parameter, and auto white balance by using a 3A algorithm, achieving a maximum image contrast, reducing overexposure or underexposure of a shot subject, and compensating a color difference of an image under different light irradiations, further presenting high-definition image information.

It may be understood that the electronic device may be a smart phone, a smart TV, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, a wearable device, a vehicle-mounted device, a smart household device, and/or a smart city device. A specific type of the electronic device is not specially limited in embodiments of this application.

It may be understood that 3A means auto focus (AF), auto exposure (AE), and auto white balance (AWB). The auto focus is a process of automatically adjusting a focal length of a camera lens to obtain a clear image. The auto exposure is a process of automatically adjusting an exposure parameter to enable a photosensitive device to obtain an appropriate exposure. The auto white balance is a process of automatically adjusting a white balance gain to enable a color of a shot image to be close to a real color of an object.

It should be noted that the 3A algorithm is actually implemented in a hardware abstraction layer of the electronic device. When the electronic device performs shooting by using a camera application, the camera application in an application layer is to interact with the hardware abstraction layer (HAL), to implement the 3A algorithm. That is, during shooting, the electronic device is not only to spend time on executing the 3A algorithm, but also to spend time on completing interaction between the camera application and the hardware abstraction layer.

FIG. 1 is a schematic diagram of a shooting process according to an embodiment of this application.

As shown in FIG. 1, an electronic device may include a camera application. A shooting user interface of the camera application may include a shutter control. It may be understood that the shutter control may be configured to monitor a user operation that triggers shooting. A user may trigger the shutter control. Taking tapping to trigger shooting as an example, when the user taps the shutter control, the user' finger touches a touch screen of the electronic device. Then, when the user releases the shutter control, a user's finger no longer touches the touch screen of the electronic device. The camera application of the electronic device may detect that the user releases the shutter control. In this case, the camera application generates a 3A trigger instruction. The 3A trigger instruction is for triggering a 3A algorithm.

The camera application may send the 3A trigger instruction to a HAL layer to be processed by a related module. A camera HAL module may process the 3A trigger instruction. When processing the 3A trigger instruction, the camera HAL module may determine that the instruction includes information (such as TRIGGER_START entry) for instructing to execute the 3A algorithm, and provide an interface to implement the 3A algorithm. During execution of the 3A algorithm, a 3A state is a 3A adjustment state. That is, in this process, a shooting parameter required for the camera lens to obtain an image is being continually adjusted. The camera HAL module continually updates the shooting parameter.

Once the 3A algorithm converges, the 3A state changes from the 3A adjustment state to a 3A lock state. This indicates that the camera HAL module has found an ideal shooting parameter and locked the ideal shooting parameter. The camera HAL module may send the ideal shooting parameter to related hardware such as a driver and a camera lens. In this case, the camera lens may obtain an image based on the ideal shooting parameter.

Once the 3A state changes to the 3A lock state, the camera HAL module may report 3A state prompt information to the camera application. It may be understood that the 3A state prompt information is used for prompting the camera application that the 3A algorithm has converged (that is, the ideal shooting parameter has been determined and locked). After receiving the 3A state prompt information sent by the camera HAL module, the camera application may send a shooting request. After receiving the shooting request from the camera application, the camera HAL module may select an image (that is, a selected frame shown in FIG. 1) from a buffered frame queue for post processing and copy the selected image. It may be understood that post processing may include image fusion and the like. The camera HAL module may fuse a copied image and an image in a variable exposure frame queue, and perform other related processing. A post-processed image is an image obtained by shooting this time. The camera HAL module may upload the image to the camera application. A gallery shortcut control of a shooting user interface of the camera application may display a thumbnail of the image. Then the camera application may send a 3A unlock instruction. It may be understood that the 3A unlock instruction is used for canceling the 3A lock state. After the camera HAL module receives the 3A unlock instruction, the 3A state changes from the 3A lock state to the 3A adjustment state.

It may be understood that the shooting parameter mentioned in this application may include a focus parameter, an exposure parameter, and a white balance parameter. The electronic device may determine, based on the focus parameter, whether the electronic device is in a good focus state. The focus parameter may include a focal length. The exposure parameter may include an aperture size, a shutter speed (that is, an exposure time), and a photosensitivity parameter. The white balance parameter includes an RGB value.

It may be understood that the variable exposure frame queue may include a plurality of image frames obtained by using different exposure parameters. In some embodiments of this application, the variable exposure frame queue may include a short exposure frame, a medium exposure frame, and a long exposure frame. An exposure time corresponding to the short exposure frame is relatively short. An exposure time corresponding to the long exposure frame is relatively long. An exposure time corresponding to the medium exposure frame is between the exposure time corresponding to the short exposure frame and the exposure time corresponding to the long exposure frame.

It may be understood that a shutter lag shown in FIG. 1 means a shutter delay, which is also referred to as a shutter time lag. The shutter delay means a time for which the camera automatically focuses, measures light, calculates an exposure, and selects an appropriate exposure combination for data calculation and storage processing when a shutter is tapped.

It should be noted that a quantity of image frames that can be accommodated in a buffered frame queue is limited. Once the quantity of image frames accommodated in the buffered frame queue reaches an upper limit, the buffered frame queue releases an image that first enters the buffered frame queue (that is, moving the image out of the buffered frame queue) based on a principle of "first-in, first-out", to accommodate a subsequently generated image frame. It may be understood the image moved out of the buffered frame queue is recycled and eliminated. In some embodiments of this application, the buffered frame queue may accommodate 8 frames of images at most.

Based on the foregoing content, the following is obtained.

First, the camera application sends the shooting request only after the user releases the shutter control and the 3A algorithm converges. In this process, the camera application and the camera HAL module interact with each other for many times, to generate a HAL time delay 1 and HAL time delay 2 shown in FIG. 1.

Second, when the camera application sends the shooting request, there are some image frames being processed in related hardware, and the camera HAL module is preparing for sending a shooting parameter. It may be understood that, in this case, the shooting parameter that the camera HAL module is preparing to send is a shooting parameter updated during implementation of the 3A algorithm. After sending the shooting parameter to a driver and related hardware device, the camera HAL module may continue to send the ideal shooting parameter. The camera lens captures an image based on a time sequence in which the shooting parameter is received. This means that the camera lens first captures the image based on an updated shooting parameter during implementation of the 3A algorithm, and then captures a variable exposure frame based on the ideal shooting parameter. After receiving the shooting request sent by the camera application, the camera HAL module may select an image for post processing from the buffered frame queue and copy the selected image. After the variable exposure frame reaches the HAL layer, the camera HAL module may perform post processing on the copied image and the variable exposure frame. An image obtained by post processing is an image obtained by shooting this time.

In this process, the camera HAL module is not only to spend time on copying the image, but also to spend time on waiting for the variable exposure frame.

In short, it takes a long time for the electronic device to respond to shooting from a time point at which the user taps the shutter control to a time point at which shooting is completed. However, as a user's demand for shooting is constantly increased, a current shooting response time of the electronic device may no longer meet the user's demand.

In addition, when selecting an image for post processing, the camera HAL module determines definition of an image in the buffered frame queue, and then selects a relatively clear image from the buffered frame queue. In this process, the camera HAL module evaluates the definition of the image by a jitter amount and sharpness information when the image is entirely exposed. This evaluation manner is not accurate to some extent. That is, the camera HAL module cannot accurately evaluate the definition of the image in the buffered frame in this evaluation manner.

This application provides a shooting method and a related device. According to the shooting method, a camera application in an electronic device may send an instruction of shooting in advance through a custom interface when a user taps a shutter control. The instruction of shooting in advance is for triggering a shooting process in advance. This means that the instruction of shooting in advance is for triggering the 3A algorithm, and triggering operations such as subsequent frame selection and post processing when the 3A algorithm converges. The electronic device may further capture the variable exposure frame in advance. The camera HAL module in the electronic device may add address information to an image in the buffered frame queue. The address information is used for indicating a position of a corresponding image in the buffered frame queue. During frame selection, the camera HAL module may record address information corresponding to a selected image, and obtain, during post processing, the corresponding image based on the address information to be fused with the variable exposure frame. The electronic device may further determine an entire jitter amount of the image based on a jitter amount of each row of pixels of the image, to evaluate definition of the image more accurately. In the foregoing shooting method, the electronic device may not only reduce a response time, but also more accurately select a clearer image for fusion. This increases definition of a shot image and improves shooting experience of the user.

The following describes some shooting scenes provided in this application.

Figure 2A:
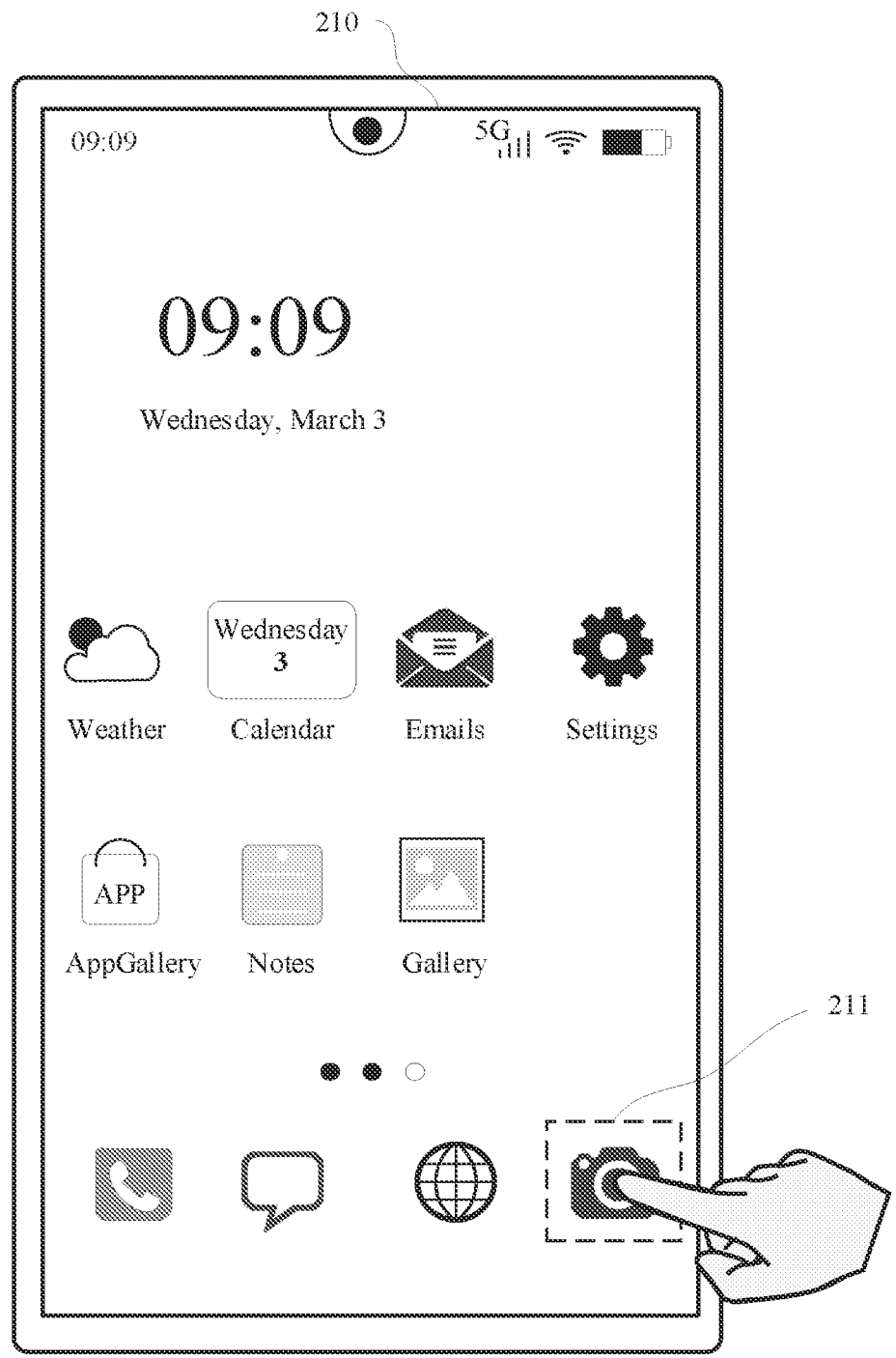
FIG. 2A to FIG. 2C are schematic diagrams of a group of user interfaces according to an embodiment of this application.

It may be understood that the term "user interface" in this specification, claims, and accompanying drawings of this application is a medium interface that is used for interaction and information exchange between an application or an operating system and a user, and implements conversion between an internal form of information and a form that can be accepted by the user. The user interface is usually represented in a form of a graphical user interface (GUI), and is a user interface that is related to a computer operation and that is displayed in a graphic manner. The user interface may be a user interface element such as an icon, a window, or a control displayed on a display of an electronic device, and the control may include a visual user interface element such as an icon, a button, a menu, a tab, a text box, a dialog box, a state bar, a navigation bar, or a widget. FIG. 2A shows an example of a user interface 210 of an electronic device.

The user interface 210 displays a page with application icons. The page may include a plurality of application icons (for example, a weather application icon, a calendar application icon, a gallery application icon, a notes application icon, an email application icon, an AppGallery icon, a settings application icon, and the like). Page indicators may also be displayed below the plurality of application icons, to indicate a positional relationship between a currently displayed page and other pages. There are a plurality of application icons (for example, a camera application icon 211, a browser application icon, an information application icon, a phone application icon) below the page indicators. The application icon remains displayed during page switching.

It may be understood that the camera application icon 211 is an icon of a camera application. The camera application icon 211 may be for triggering start of a camera application, that is a camera application program. The camera application is an image shooting application on an electronic device such as a smart phone or a tablet computer. A name of the application is not limited in this application.

The electronic device may detect a user operation acting on the camera application icon 211. In response to the user operation, the electronic device may display a user interface 220 shown in FIG. 2B.

The user interface 220 may include a setting region 221, a preview region 222, a camera mode option 223, a gallery shortcut control 224, a shutter control 225, and a camera lens flipping control 226.

The setting region 221 may include a setting control and a flash control.

The preview region 222 may be used for displaying an image captured by a camera lens in real time. The electronic device may refresh display content in the preview region 222 in real time, so that the user previews an image currently captured by the camera lens.

One or more shooting mode options may be displayed in the camera mode option 223. The one or more shooting mode options may include a night mode option, a portrait mode option, a photo mode option, a video mode option, and a more option. The one or more shooting mode options may be expressed as text information on the user interface, such as "NIGHT", "PORTRAIT", "PHOTO", "VIDEO", and "MORE". In addition, the one or more shooting mode options may be further displayed as icons or interactive elements (IE) in other forms on the user interface.

The gallery shortcut control 224 may be used for starting a gallery application. In response to a user operation acting on the gallery shortcut control 224, for example, a tap operation, the electronic device may start the gallery application. In this way; the user may easily view a shot photo and video, and there is no need to exit the camera application before enabling the gallery application. The gallery application is an application for picture management on an electronic device such as a smart phone or a tablet computer, and may also be referred to as a "gallery". A name of the application is not limited in this embodiment. The gallery application may support the user in performing various operations on a picture stored in the electronic device, for example, operations such as browsing, editing, deleting, and selecting.

The shutter control 225 may be used for monitoring an operation performed by the user to trigger shooting. The electronic device may detect a user operation acting on the shutter control 225. In response to the operation, the electronic device may obtain an image by using the camera lens and store the image as a picture in the gallery application. In addition, the electronic device may further display a thumbnail of the stored image in the gallery shortcut control 224. That is, the user may tap the shutter control 225 to trigger shooting. It may be understood that the shutter control 225 may be a button or a control in another form.

The camera lens flipping control 226 may be used for monitoring an operation performed by the user to trigger flipping of a camera lens.

The electronic device may detect an operation of shutter tapping acting on the shutter control 225. In response to the operation of shutter tapping, the camera application may generate an instruction of shooting in advance and send the instruction of shooting in advance to a HAL layer through a custom interface. A camera HAL module the electronic device may determine a current 3A state after receiving the instruction of shooting in advance. If the 3A state is a 3A lock state, the camera HAL module may perform operations such as frame selection and perform post processing. It may be understood that an image obtained by post processing is an image obtained by shooting this time. The camera HAL module may upload the image to the camera application. The electronic device may store the image to the gallery application. The electronic device may display a user interface 230 shown in FIG. 2C.

Controls included in the user interface 230 are basically the same as controls included in the user interface 220. A difference is that a previewed image displayed in a preview region 231 in the user interface 230 changes, and an image displayed in a gallery shortcut control 232 changes. It may be understood that an image displayed by the gallery shortcut control 232 is an image obtained by the camera lens of the electronic device and stored in the gallery application.

Figure 2B:
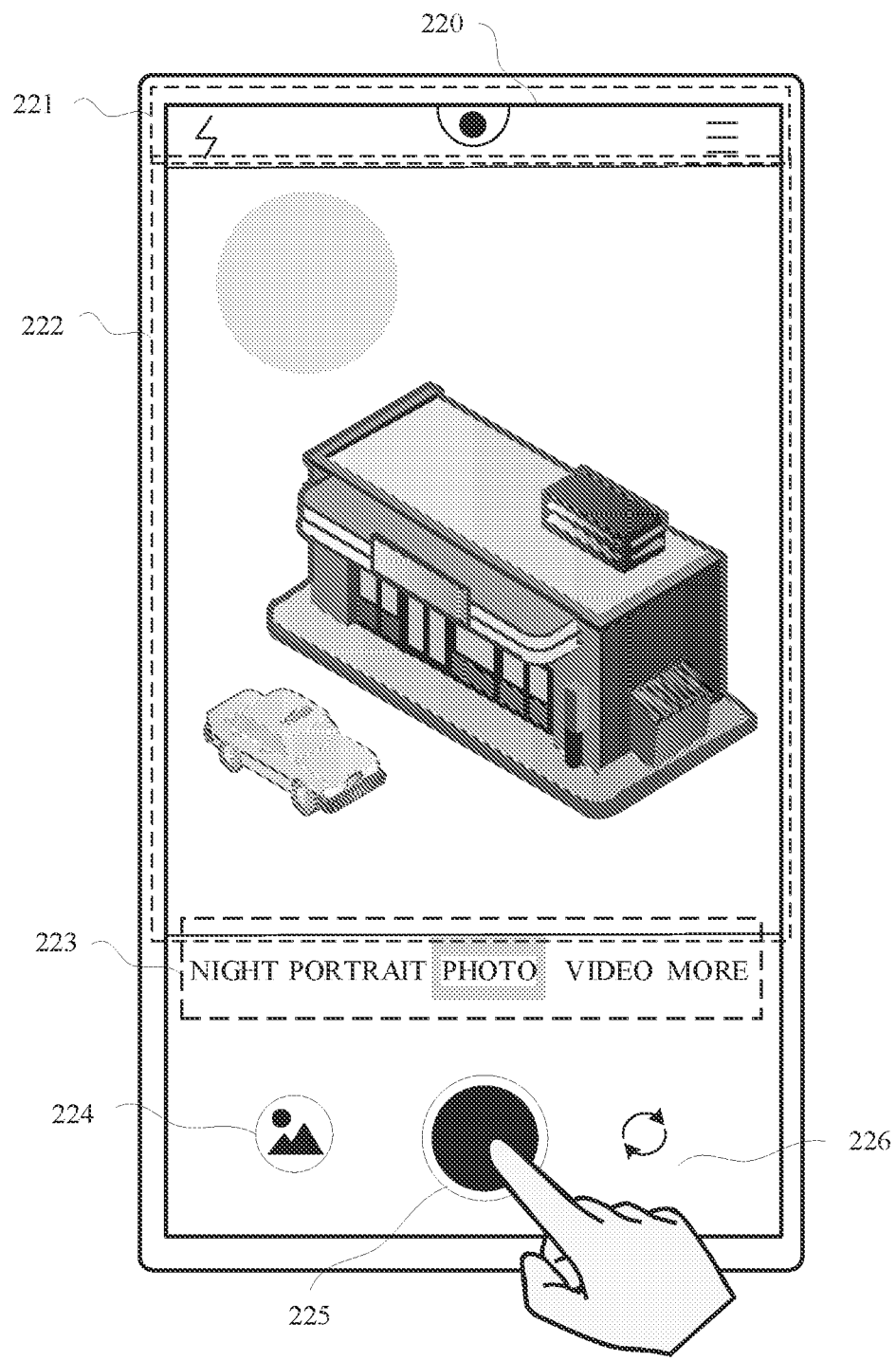
Figure 2C:
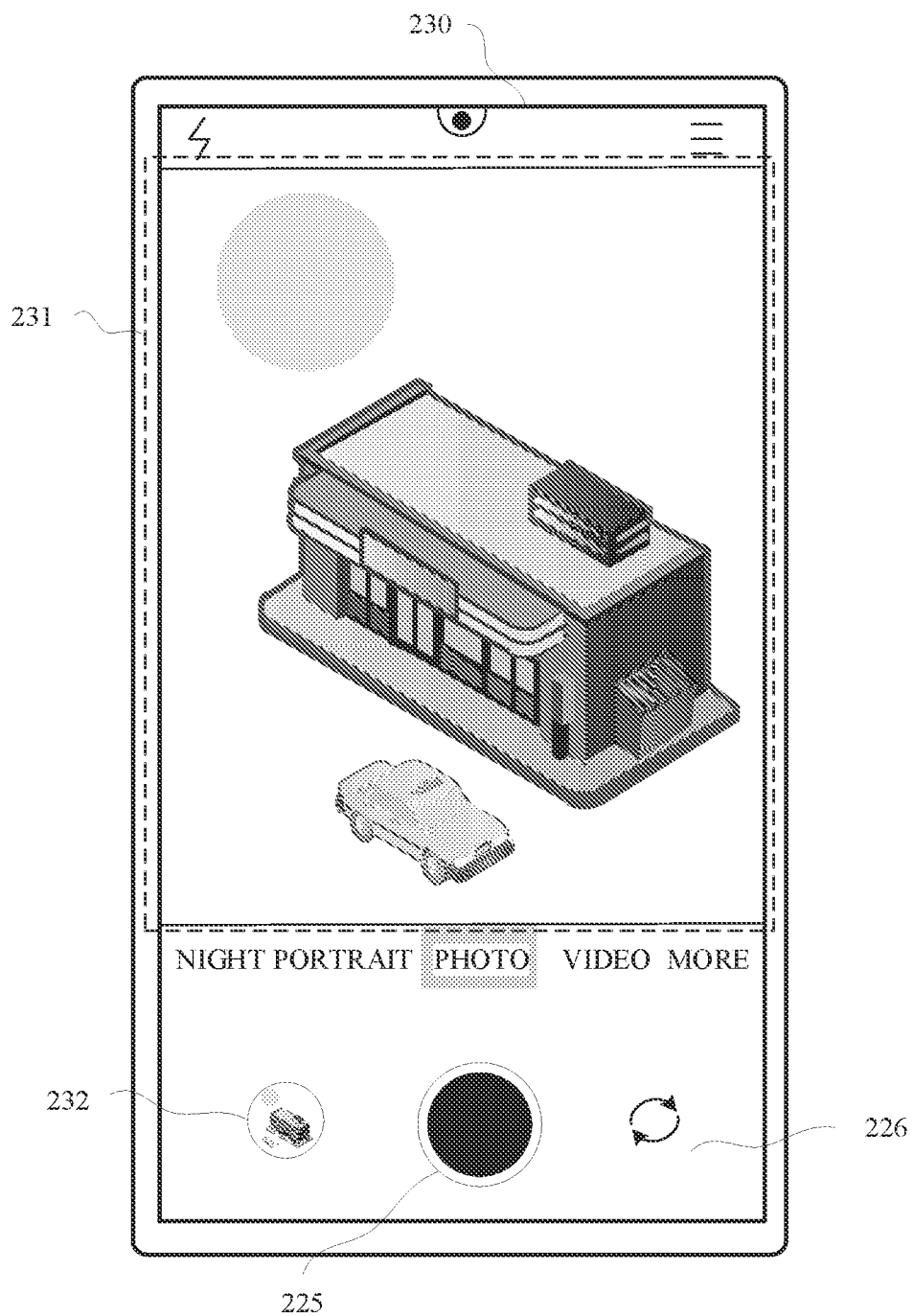

It should be noted that the user interfaces shown in FIG. 2A to FIG. 2C are only examples provided in this application, and should not be regarded as limitations on this application. That is, user interfaces shown in FIG. 2A to FIG. 2C may display more or less content, which is not limited in this application.

Figure 3B:
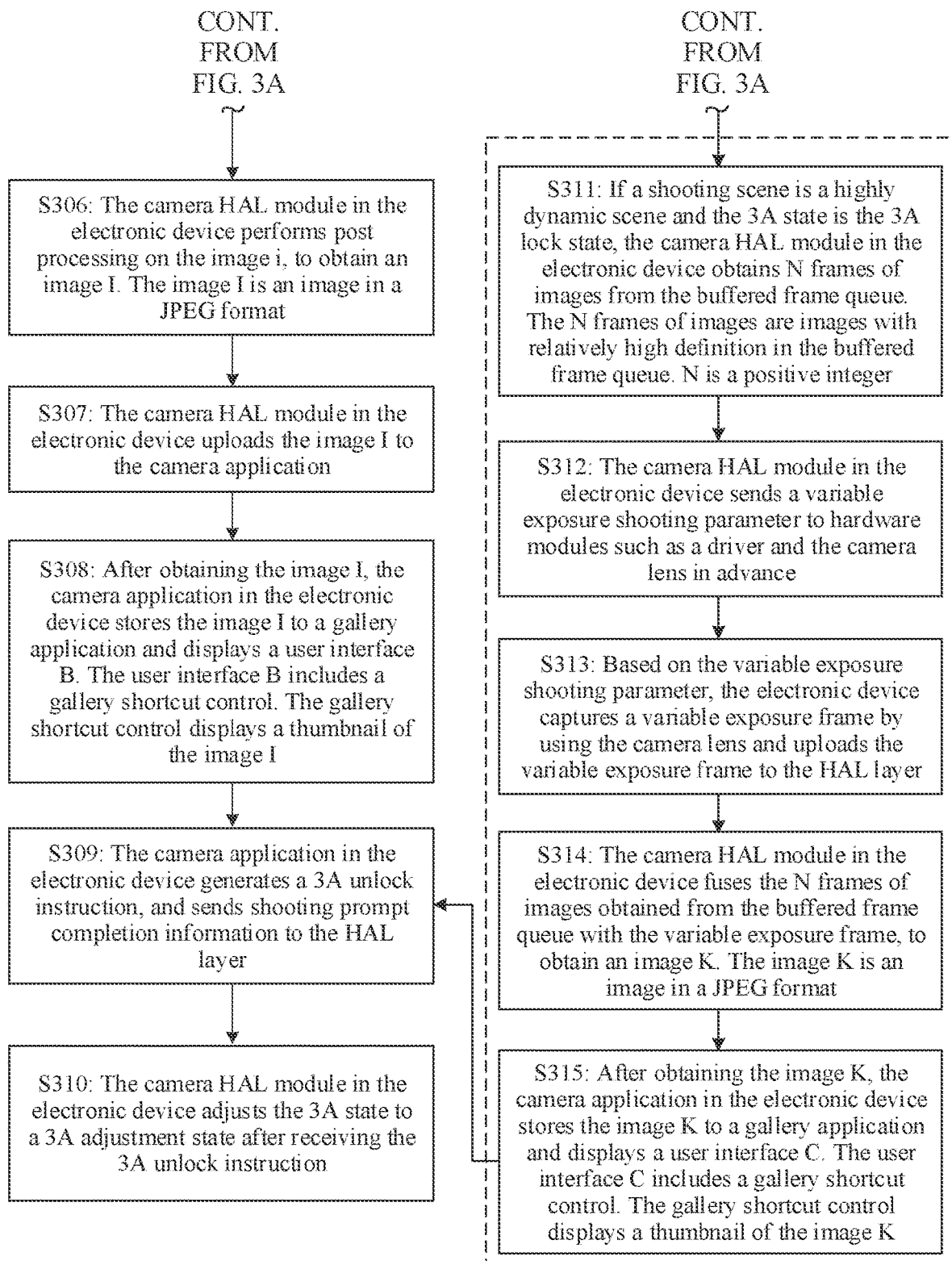

With reference to FIG. 3A and FIG. 3B, the following describes a shooting method provided in this application.

S301: An electronic device displays a user interface A. The user interface A is a shooting user interface of a camera application. The camera application is an application in the electronic device. The user interface A includes a shutter control.

Specifically, a user may tap a camera application icon. In response to the tapping operation, the electronic device may start the camera application and display the user interface A. It may be understood that the camera application is an application in the electronic device. The user interface A is a shooting user interface of a camera application. The user interface A includes a shutter control. The user may implement shooting by triggering the shutter control. The shutter control is used for monitoring an operation performed by the user to trigger shooting.

In some embodiments of this application, the user interface A may be a user interface 220 shown in FIG. 2B.

S302: The electronic device detects that the user taps the shutter control, and the camera application in the electronic device generates an instruction of shooting in advance in response to an operation of tapping the shutter control. The instruction of shooting in advance is for triggering a shooting process in advance.

It may be understood that the user may trigger the shutter control. Taking tapping to trigger shooting as an example, when the user taps the shutter control, a user's finger touches a touch screen of the electronic device. After receiving a touch operation, the touch screen generates a corresponding input event. The input event is transmitted to the camera application. After receiving the input event, the camera application generates the instruction of shooting in advance. The instruction of shooting in advance is for triggering a shooting process in advance.

S303: The camera application in the electronic device sends the instruction of shooting in advance to a HAL layer through an interface X.

Specifically, after generating the instruction of shooting in advance, the camera application in the electronic device may send the instruction of shooting in advance to the HAL layer through the interface X, so that a camera HAL module in the HAL layer processes the instruction of shooting in advance.

It may be understood that the interface X is a custom interface. The interface X is used for sending the instruction of shooting in advance to the HAL layer, and is not a general interface for interaction between an application layer and the HAL layer.

S304: The camera HAL module in the HAL layer in the electronic device determines a current 3A state after receiving the instruction of shooting in advance.

It may be understood that the camera HAL module in the electronic device may receive the instruction of shooting in advance sent by the camera application, and determine the current 3A state after receiving the instruction of shooting in advance, to determine, based on the current 3A state, whether a 3A algorithm converges or not.

It should be noted that if the current 3A state is a 3A lock state, it indicates that the 3A algorithm has converged. In this case, the camera HAL module has obtained an ideal shooting parameter and locked the ideal shooting parameter. In this case, the electronic device may continue to perform a subsequent step. If the current 3A state is a 3A adjustment state, the HAL module in the electronic device continues performing the 3A algorithm. After the 3A algorithm converges (that is, the 3A state changes to a 3A lock state), the electronic device continues to perform a subsequent step.

In some embodiments of this application, when the 3A state is the 3A adjustment state, a metadata entry for auto focus is AF_STATE_PASSIVE_SCAN, a metadata entry set for auto exposure is AE_STATE_SEARCHING, and a metadata entry set for auto white balance is AWB_STATE_SEARCHING.

In some embodiments of this application, if the 3A state is the 3A lock state, the metadata entry set for the auto focus is AF_STATE_FOCUSED_LOCKED, the metadata entry set for the auto exposure is AE_STATE_LOCKED, and the metadata entry set for the auto white balance is AWB_STATE_LOCKED.

It may be understood that, for related descriptions of the 3A state and metadata entries, refer to related technical documents. Details are not described herein.

S305: If the 3A state is the 3A lock state, the camera HAL module in the electronic device obtains an image i from a buffered frame queue based on a time point at which the user triggers the shutter control. A time point at which the electronic device captures the image i by using a camera lens is the same as the time point at which the user triggers the shutter control. The image i is a RAW image. The buffered frame queue is used for storing a RAW image captured by the camera lens.

Specifically, if the 3A state is the 3A lock state, the camera HAL module in the electronic device may obtain the image i from the buffered frame queue. The time point at which the electronic device captures the image i by using the camera lens is the same as the time point at which the user triggers the shutter. The image i is the RAW image. The buffered frame queue is used for storing the RAW image captured by the camera lens.

It may be understood that the RAW image is original data obtained when a sensor (for example, a CMOS or CCD image sensor) converts a captured light source signal into a digital signal, and is also referred to an original image file.

It should be noted that the electronic device may shoot an image with zero shutter lag (ZSL), reducing shooting lag and providing "shoot-as-you-see" shooting experience. In this case, after the electronic device starts the camera application, the camera application starts a preview process, and the electronic device may generate a previewed image and shot image by using the camera lens. The previewed image is an image displayed in a preview region of the electronic device for the user to view. The shot image is a RAW image corresponding to the previewed image. It may be understood that frame data of the previewed image is less than frame data of the shot image.

In some embodiments of this application, the buffered frame queue stores the shot image, that is, the RAW image corresponding to the previewed image.

It may be understood that a quantity of frames of images stored in the buffered frame queue may be set based on an actual demand, which is not limited in this application.

In some embodiments of this application, if the 3A state is the 3A lock state, the camera HAL module in the electronic device may obtain the image i from the buffered frame queue based on the time point at which the user triggers the shutter, a jitter amount and sharpness (an FV value) of the image in the buffered frame queue. Specifically, if the 3A state is the 3A lock state, first, the camera HAL module may determine the time point at which the user triggers the shutter based on the shutter lag, and sort images in the buffered frame queue in ascending order based on an absolute value of a difference between a time point at which an image is generated and the time point at which the user triggers the shutter, to obtain a new frame queue. Second, the camera HAL module may successively determine sharpness of sorted images. If the FV value of an image is not greater than a preset FV value, sharpness of a next frame of image in the new frame queue is determined; or if the FV value of an image is greater than the preset FV value, a jitter amount of the image is determined. Third, when the jitter amount is determined, if the jitter amount of the image is less than a preset jitter amount, the camera HAL module obtains the image from the buffered frame queue, that is, the image is the image i; or if the jitter amount of the image is not less than the preset jitter amount, the camera HAL module may continue to determine the sharpness of a next frame of image in the new frame queue.

It may be understood that, if the camera HAL module cannot obtain the image i from the buffered frame queue (that is, all images in the buffered frame queue do not meet a requirement of sharpness and a jitter amount) after determining the sharpness and jitter amount, the preset FV value may be decreased and/or the preset jitter amount may be increased.

It may be understood that obtaining the image i is to be performed based on the absolute value of the difference between the time point at which an image is generated and the time point at which the user triggers the shutter, the FV value of the image, and the jitter amount. Optionally, the camera HAL module in the electronic device may determine priorities of the three elements, and determine, based on the priorities, a sequence in which the three elements are determined.

In some embodiments of this application, in a highly dynamic scene, the camera HAL module in the electronic device may select one or more frames of images from the buffered frame queue, and fuse the one or more frames of images with a variable exposure image (that is, variable exposure frame), to obtain a shot image with diversified light and dark details, a greater image contrast, and higher definition.

S306: The camera HAL module in the electronic device performs post processing on the image i, to obtain an image I. The image I is an image in a JPEG format.

Specifically, the camera HAL module in the electronic device may perform post processing on the image i after obtaining the image i from the buffered frame queue, to obtain the image I in the JPEG format. It may be understood that post processing includes operations such as format conversion and image fusion.

It may be understood that JPEG (Joint Photographic Experts Group), is a standard for continuous-tone still image compression, with a file suffix of .jpg or .jpeg, and is a common image file format.

In some embodiments of this application, the image I may alternatively be an image in another format, which is not limited in this application.

S307: The camera HAL module in the electronic device uploads the image I to the camera application.

Specifically; the camera HAL module in the electronic device may upload, to the camera application, the image I obtained by post processing.

S308: After obtaining the image I, the camera application in the electronic device stores the image I to a gallery application and displays a user interface B. The user interface B includes a gallery shortcut control. The gallery shortcut control displays a thumbnail of the image I.

Specifically, after obtaining the image I uploaded by the camera HAL module, the camera application in the electronic device may store the image I in the gallery application (that is, the gallery application program) and display the user interface B. The user interface B may include the gallery shortcut control. The gallery shortcut control may display the thumbnail of the image I. The gallery shortcut control is configured to quickly go to the gallery application, so that the user views an image.

S309: The camera application in the electronic device generates a 3A unlock instruction, and sends shooting completion prompt information to the HAL layer.

Specifically, after obtaining the image I, the camera application in the electronic device may generate the 3A unlock instruction and send the 3A unlock instruction to the HAL layer, so that the 3A unlock instruction is to be processed by the camera HAL module in the HAL layer.

S310: The camera HAL module in the electronic device adjusts the 3A state to a 3A adjustment state after receiving the 3A unlock instruction.

Specifically; the camera HAL module in the electronic device may adjust the 3A state from the 3A lock state to the 3A adjustment state after receiving the 3A unlock instruction.

Optionally, after performing step S301 to step S305 in the foregoing embodiment, the electronic device may continue to perform the following steps.

S311: If a shooting scene is a highly dynamic scene and the 3A state is the 3A lock state, the camera HAL module in the electronic device obtains N frames of images from the buffered frame queue. The N frames of images are images with relatively high definition in the buffered frame queue. N is a positive integer.

Specifically, when the shooting scene is the highly dynamic scene and the 3A state is the 3A lock state, the camera HAL module in the electronic device may determine definition of images in the buffered frame queue based on a time point at which the variable exposure frame is generated, and a jitter amount and sharpness of the images in the buffered frame queue, and obtain the N frames of images with relatively high definition. That is, the camera HAL module may obtain the N frames of images with top N definition in the buffered frame queue. N is a positive integer.

In some embodiments of this application, N=1. In this case, the camera HAL module may obtain the N frames of images based on an absolute value of a difference between a time point at which the image in the buffered frame queue is generated and the time point at which the variable exposure frame is generated, and an FV value and the jitter amount of the image in the buffered frame queue. For that the camera HAL module determines the time point at which the variable exposure frame is generated, refer to a related description that the user triggers a shutter in step S305. For determining of the FV value and the jitter amount, refer to step S305. The details are not described herein again.

In some embodiments of this application, N>1. In this case, similar to a situation in which N=1, the camera HAL module may obtain the N frames of images based on the absolute value of the difference between the time point at which the image in the buffered frame queue is generated and the time point at which the variable exposure frame is generated, and the FV value and the jitter amount of the image in the buffered frame queue. The details are not described herein again.

It may be understood that the shooting scene as a highly dynamic scene means that a shooting mode of the camera application is a high dynamic range imaging (HDRI or HDR) mode when the user taps the shutter control. In computer graphics and cinematography; the high dynamic range imaging is a technology to achieve a larger exposure dynamic range (that is, a greater difference between light and dark) than that of an ordinary digital imaging technology:

In some embodiments of this application, the user may enable or disable the HDR mode.

In some embodiments of this application, when the user triggers the shutter control to shoot an image, the camera application in the electronic device may shoot an image in the HDR mode by default.

It may be understood that a specific value of N may be set based on an actual demand, which is not limited in this application.

S312: The camera HAL module in the electronic device sends a variable exposure shooting parameter to hardware modules such as a driver and the camera lens in advance.

It may be understood that, on the one hand, the camera HAL module in the electronic device continuously sends the shooting parameter to the hardware such as the driver and the camera lens, so that the camera lens may continuously generate images based on the obtained shooting parameter; on the other hand, the electronic device captures a previewed image and a shot image by using the hardware such as the camera lens, and transmits the previewed image and the shot image to the HAL layer. After the previewed image and the shot image are transmitted to the HAL layer, the shot image may be stored in the buffered frame queue, and the previewed image is continually transmitted to the camera application.

Because the camera application in the electronic device sends the instruction of shooting in advance, that is, triggers a shooting process in advance (refer to step S302 and step S303 for details), once the 3A algorithm converges, that is, the 3A state is the 3A lock state, after the camera HAL module in the electronic device receives the instruction of shooting in advance, it means that the camera HAL module has found an ideal shooting parameter and locked the ideal shooting parameter. It may be understood that, in the highly dynamic scene, the ideal shooting parameter locked by the camera HAL module is a variable exposure shooting parameter. Next, the camera HAL module may continually perform frame selection and a post processing operation (refer to step S305 and step S306 for details) without informing the camera application of a current 3A state and waiting for the camera application to send a shooting request. That is, once the 3A algorithm converges, the camera HAL module automatically performs a subsequent shooting process. Based on the foregoing description, before the camera HAL module obtains the variable exposure shooting parameter, the camera HAL module continually sends the shooting parameter. In addition, the electronic device captures an image based on the shooting parameter by using the camera lens. This means that after obtaining the variable exposure shooting parameter, the camera HAL module is also to send a shooting parameter obtained before the variable exposure shooting parameter. In this case, the camera HAL module may send the variable exposure shooting parameter to the hardware modules such as the driver and the camera lens in advance, without waiting until the shooting parameter obtained before the variable exposure shooting parameter is sent, saving time. In addition, the time point at which the variable exposure frame is generated is changed to enable the variable exposure frame to be generated in advance, facilitating subsequent post processing.

It may be understood that the variable exposure shooting parameter may include a shooting parameter corresponding to a variable exposure frame. In some embodiments of this application, the camera lens in the electronic device may obtain a long exposure frame, a medium exposure frame, and a short exposure frame based on the variable exposure shooting parameter. In this case, the variable exposure shooting parameter may include an exposure parameter corresponding to the long exposure frame, an exposure parameter corresponding to the medium exposure frame, and an exposure parameter corresponding to the short exposure frame. It may be understood that an exposure time corresponding to the short exposure frame is relatively short, an exposure time corresponding to the long exposure frame is relatively long, and an exposure time corresponding to the medium exposure frame is between an exposure time corresponding to the short exposure frame and an exposure time corresponding to the long exposure frame.

It may be understood that a quantity of the variable exposure frames may be set based on an actual demand, which is not limited in this application.

Figure 4:
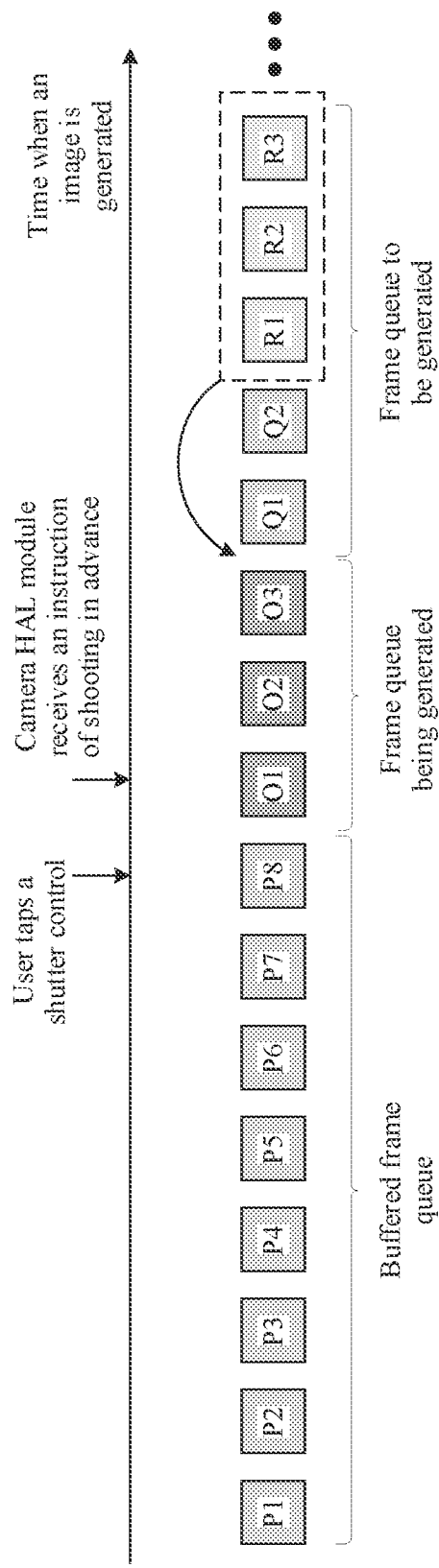
FIG. 4 is a schematic diagram of an image generation sequence according to an embodiment of this application.

For example, as shown in FIG. 4, an image P1 to an image P8 are images in a buffered frame queue. An image O1 to an image O3 are images that are being generated. That is, the image O1 to the image O3 are being processed in a hardware module (e.g., a sensor, an image signal processor) of an electronic device. An image Q1 and an image Q2 are images to be generated. That is, shooting parameters corresponding to the image Q1 and image Q2 are also located in a HAL layer. After obtaining the shooting parameters corresponding to the image Q1 and the image Q2, a camera HAL module obtains shooting parameters, that is, variable exposure shooting parameters, corresponding to three frames of images, that is, a variable exposure frame R1 to a variable exposure frame R3. The camera HAL module may send the shooting parameters corresponding to the variable exposure frame R1 to the variable exposure frame R3 to hardware modules such as a driver and a camera lens in advance. In this case, time points at which the variable exposure frame R1 to the variable exposure frame R3 are generated are changed to enable the variable exposure frame R1 to the variable exposure frame R3 to be generated in advance. As shown in FIG. 4, the electronic device immediately captures the variable exposure frame R1 to the variable exposure frame R3 after capturing the image O3 by using the camera lens. After the variable exposure frame R1 to the variable exposure frame R3 are captured, the electronic device may capture the image Q1 and the image Q2 by using the camera lens.

S313: Based on the variable exposure shooting parameter, the electronic device captures a variable exposure frame by using the camera lens and uploads the variable exposure frame to the HAL layer.

Specifically, after the camera HAL module sends the variable exposure shooting parameter to the hardware modules such as the driver and the camera lens in advance, based on the variable exposure shooting parameter, the electronic device may capture the variable exposure frames by using the camera lens.

S314: The camera HAL module in the electronic device fuses the N frames of images obtained from the buffered frame queue with the variable exposure frame, to obtain an image K. The image K is an image in a JPEG format.

Specifically; after the variable exposure frame is uploaded to the HAL layer, the camera HAL module in the electronic device may fuse the N frames of images obtained from the buffered frame queue with the variable exposure frame. The N frames of image and the variable exposure image are both RAW images. The image K is an image in a JPEG format.

It may be understood that the camera HAL module may further perform other post processing (for example, brightening, noise reduction) on the N frames of images and the variable exposure frame, which is not limited in this application.

S315: After obtaining the image K, the camera application in the electronic device stores the image K to a gallery application and displays a user interface C. The user interface C includes a gallery shortcut control. The gallery shortcut control displays a thumbnail of the image K.

Specifically, after obtaining the image K uploaded by the camera HAL module, the camera application in the electronic device may store the image K into the gallery application (that is, the gallery application program) and display the user interface C. The user interface C may include the gallery shortcut control. The gallery shortcut control may display the thumbnail of the image K. The gallery shortcut control is configured to quickly go to the gallery application, so that the user views an image.

It may be understood that after performing step S315, the electronic device may continue to perform step S309 and step S310 in the foregoing embodiment.

It should be noted that in some embodiments of this application, step S311 to step S315 may be used in the shooting process shown in FIG. 1.

Optionally, the camera HAL module in the electronic device may obtain an image from the buffered frame queue by using address information. Details are as follows.

Specifically, the camera HAL module in the electronic device may add address information to an image in the buffered frame queue. The address information is used for indicating a position of an image in the buffered frame queue. That is, the camera HAL module may find the corresponding image in the buffered frame queue by using the address information. The camera HAL module may record the address information of the image to be obtained in the buffered frame queue. The camera HAL module may obtain the corresponding image based on the recorded address information.

It should be noted that after the camera HAL module is to record the address information of images to be obtained in the buffered frame queue, a reference count corresponding to these images with the recorded address information is added by 1.

It may be understood that a value corresponding to the reference count is a quantity of times for which the image is about to be invoked or being invoked. For example, when the reference count corresponding to the image is 0, it means that no module in the electronic device is to invoke the image. In this case, once the image is moved out of the buffered frame queue, the image is recycled and eliminated. For images with recorded address information, a reference count corresponding to these images is not 0. If these images are moved out of the buffered frame queue, these images are not recycled and eliminated, but are not recycled and eliminated until the reference count corresponding to these images becomes 0.

It may be understood that after the camera HAL module obtains an image from the buffered frame queue and performs a subsequent operation (such as post processing) based on the image, if the image is no longer required, the camera HAL module may subtract 1 from the reference count of the image.

In some embodiments of this application, the camera HAL module may find an image i from the buffered frame queue based on a time point at which the user triggers the shutter control (refer to step S305 for details) and record address information of the image i. In this case, if the image i is moved out of the buffered frame queue, the image i is not recycled and eliminated, but the image i is recycled and eliminated only after the camera HAL module obtains the image I (refer to step S306 for details).

In some embodiments of this application, the camera HAL module may obtain N frames of images (refer to step S311 for details) from the buffered frame queue, and record address information of the N frames of images. In this case, if one or more frames of images of the N frames of images are moved out of the buffered frame queue, the one or more frames of images are not recycled and cleared, but are recycled and eliminated only after the camera HAL module obtains the image K (refer to step S314 for details).

Figure 5:
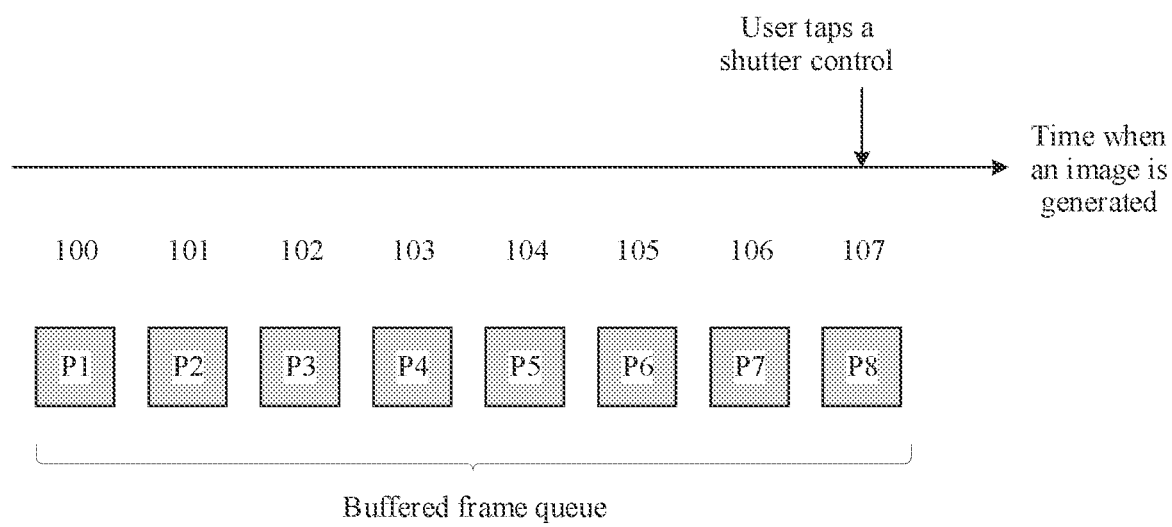
FIG. 5 is a schematic diagram of a buffered frame queue according to an embodiment of this application.

For example, as shown in FIG. 5, there are 8 frames of images, an image P1 to an image P8, in a buffered frame queue. Address information of the image P1 to the image P8 is 100, 101, 102, 103, 104, 105, 106 and 107, respectively. When a user taps a shutter control, an electronic device captures the image P8 through a camera lens. That is, a time point at which the user taps the shutter control is the same as a time point at which the image P8 is generated. In a possible implementation, a camera HAL module in the electronic device may record address information 107 of the image P8. In this case, the camera HAL module may find the image P8 through 107, to perform post processing on the image P8. In another possible implementation, the camera HAL module in the electronic device determines that six frames of images from an image P3 to the image P8 have relatively high definition, and may record address information 102, 103, 104, 105, 106, and 107 of the image P3 to the image P8. In this case, the camera HAL module may find the image P3 to the image P8 by using 102, 103, 104, 105, 106 and 107, respectively, fusing the image P3 to the image P8 and variable exposure frames.

Optionally, the electronic device may determine a jitter amount and sharpness of a whole frame of image based on a jitter amount and sharpness information of pixels in different rows of the whole frame of image. Details are as follows.

First, an exposure manner of a rolling shutter is introduced.

Electronic devices such as a digital camera and mobile phone mainly use the rolling shutter, and the exposure manner of using the rolling shutter is exposure row by row.

Figure 6:
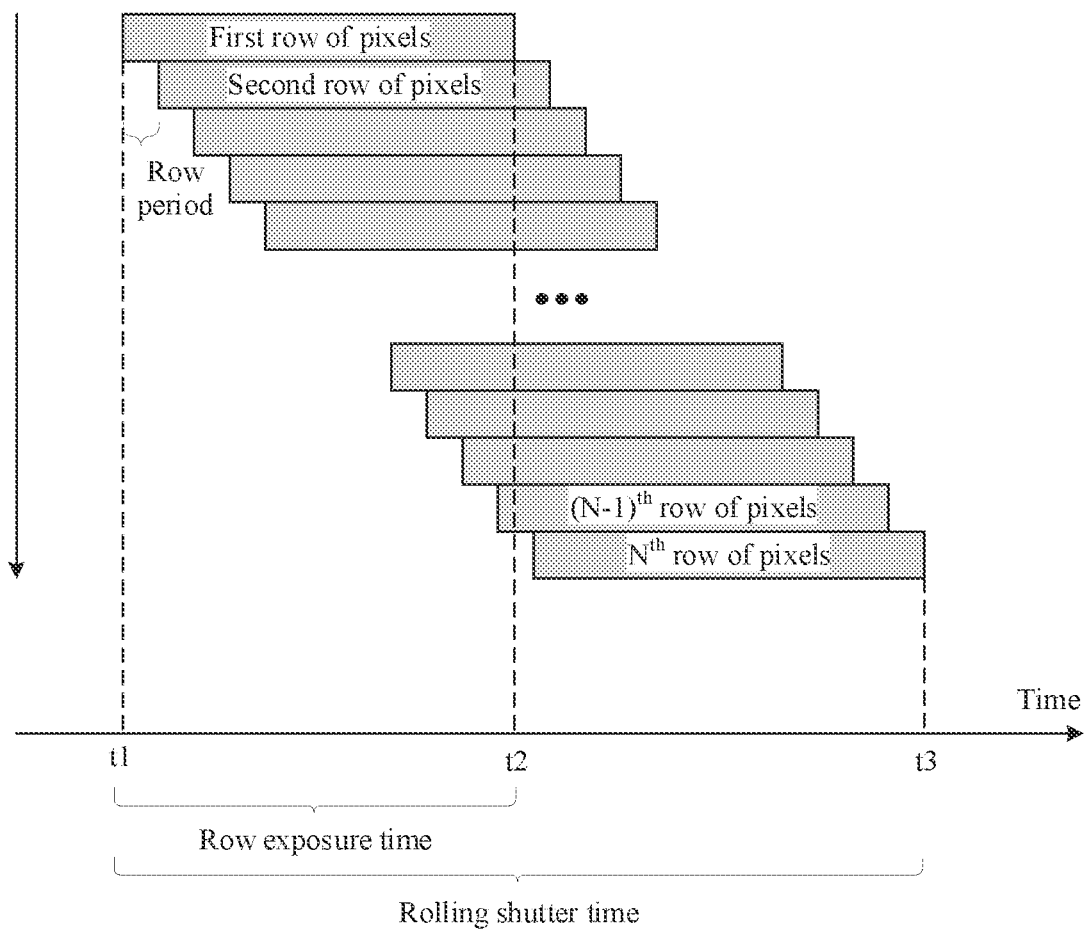
FIG. 6 is a schematic diagram of exposure of a rolling shutter according to an embodiment of this application.

Specifically, as shown in FIG. 6, a sensor (for example, a CMOS image sensor) starts exposing a first row of pixels of a frame of image, and starts exposing a second row of pixels after one row period. Similarly, after an $(N-1)^{th}$ row of pixels start to be exposed, an $N^{th}$ row of pixels start to be exposed after one row period. That is, a time difference between a time point at which each row of pixels start to be exposed and a time point at which a next row of pixels of the row start to be exposed is one row period. Therefore, the time point at which each row of pixels start to be exposed is different.

It may be understood that the row period may be determined by a capability of the sensor. Row periods of different sensors may be different. Therefore, row periods of different electronic devices may also be different. A value of the row period is not limited in this embodiment of this application.

A method for determining the jitter amount and sharpness of the whole frame of image is introduced below:

A camera HAL module in an electronic device may not only obtain jitter information from a gyro sensor, but also obtain sharpness information of an image. It may be understood that the jitter information may include gyro data (gyro data). The gyro means a gyroscope (gyroscope) That is, the jitter information is data obtained by the gyro sensor. For example, the jitter information may include an angular velocity and/or jitter angle of the electronic device around three axes (that is, an X axis, a Y axis, and a Z axis) sent by the gyro sensor. It may be understood that the gyro data may reflect motion information of the electronic device.

Specifically, the camera HAL module in the electronic device may sample the whole frame of image, to obtain a sampled image row. The camera HAL module may determine, based on a sampling time of the gyro data and optical image stabilization (OIS) data of the whole frame of image during an exposure period, a position of the sampled image row reached by a rolling shutter, to obtain the gyro data and OIS data of the sampled image row during the exposure period of the row. Then the camera HAL module may obtain a displacement vector of the camera of the sampled image row during the exposure period of the row based on the gyro data and OIS data of the sampled image row during the exposure period of the row; and obtain an integral of the displacement vector, to obtain a corresponding integration curve. The camera HAL module may use a peak-to-peak value on the integration curve as a jitter amount of the sampled image row. The camera HAL module may statistically average jitter amount of all sampled image rows, to obtain a jitter amount of a whole frame of image during exposure. In addition, the camera HAL module in the electronic device may further obtain sharpness information of the sampled image rows, and statistically average sharpness information of the sampled image rows, to obtain sharpness of the whole frame of image.

In some embodiments of this application, if the jitter amount of the whole frame of image is less than a first threshold and the sharpness is greater than a second threshold, the camera HAL module determines that the image is clear.

Compared with directly obtaining the jitter information and sharpness information of the whole frame of image to determine the sharpness of the image, the sharpness can be determined more accurately in the foregoing manner.

In some embodiments of this application, the camera HAL module may obtain corresponding gyro displacement information based on angular velocity information included in the gyro data. The OIS data may include OIS displacement. The camera HAL module may use a difference between a maximum gyro displacement and a minimum OIS displacement as the jitter amount of the sampled image row.

In some embodiments of this application, the sampled image row is evenly distributed in the whole frame of image.

It may be understood that the sharpness is an index reflecting definition of an image plane and sharpness of an image edge. When the sharpness is increased, a detail contrast on the image plane is also relatively high.

The following describes an apparatus revolved in an embodiment of this application.

Figure 7:
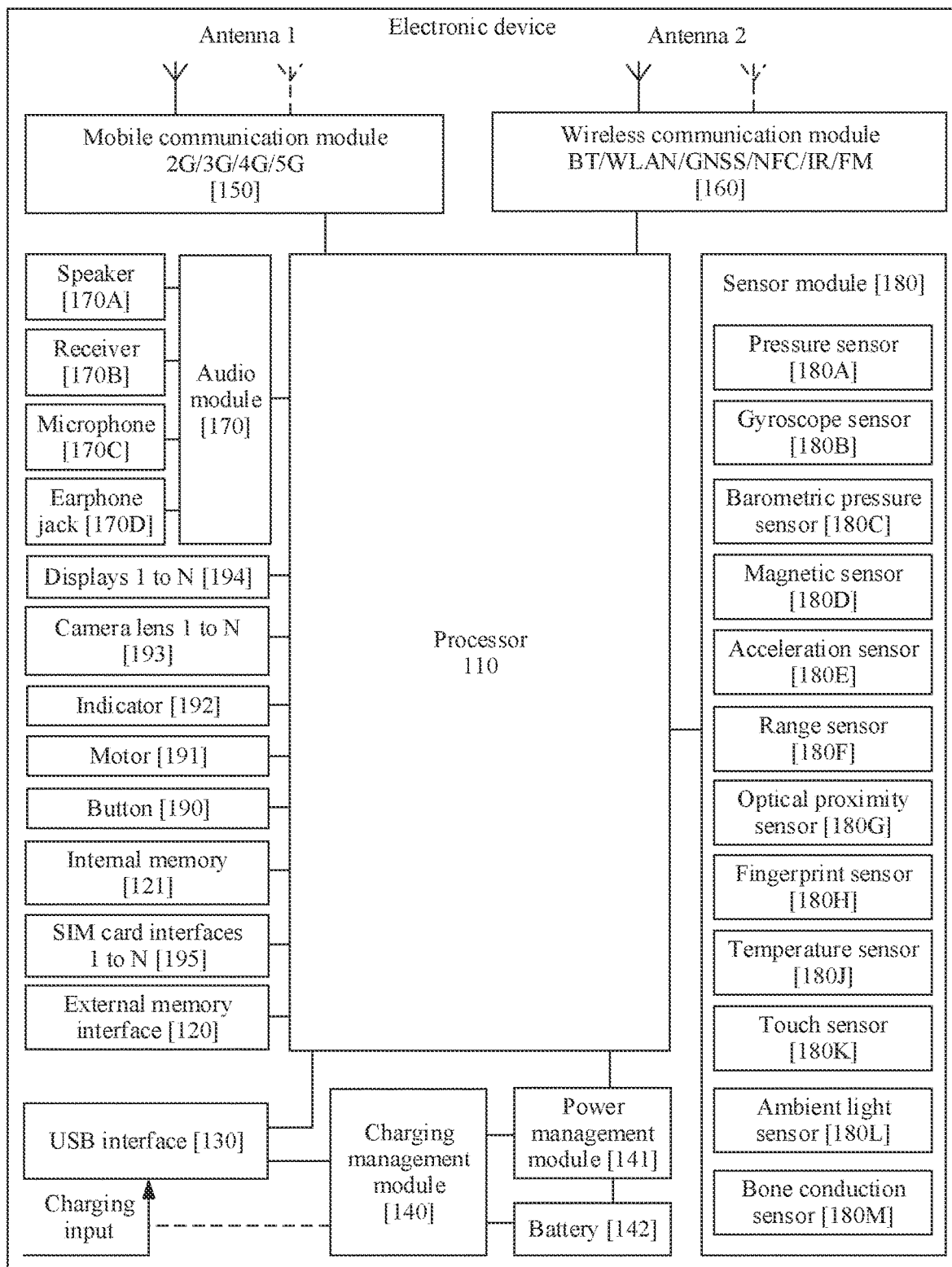
FIG. 7 is a schematic diagram of a hardware structure of an electronic device according to an embodiment of this application.

FIG. 7 is a schematic diagram of a hardware structure of an electronic device according to an embodiment of this application.

The electronic device may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera lens 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient optical sensor 180L, a bone conduction sensor 180M, and the like.

It may be understood that the structure illustrated in this embodiment of the present invention does not constitute a specific limitation on the electronic device. In some other embodiments of this application, the electronic device may include more or fewer components than those shown in the figure, or combine some components, or split some components, or have a different component arrangement. The components in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be separate devices or may be integrated into one or more processors.

The controller may be a nerve center and a command center of the electronic device. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

It may be understood that, an interface connection relationship between modules shown in this embodiment of the present invention is merely a schematic description, and does not limit a structure of the electronic device. In some other embodiments of this application, an interface connection manner that is different from those in the foregoing embodiments or a combination of a plurality of interface connection manners may be alternatively used for the electronic device.

The charging management module 140 is configured to receive a charging input from a charger.

The power management module 141 is configured to connect to the battery 142, the charging management module 140, and the processor 110.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device may be configured to cover one or more communication frequency bands. Different antennas may be further multiplexed, to improve antenna utilization.

The mobile communication module 150 may provide a solution that includes wireless communication such as 2G/3G/4G/5G and that is applied to the electronic device.

The wireless communication module 160 may provide a wireless communication solution that is applied to the electronic device and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like.

The electronic device implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs and execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device may include one or N displays 194, where N is a positive integer greater than 1.

The electronic device may implement an obtaining function by using the ISP, the camera lens 193, the video codec, the GPU, the display 194, the application processor, and the like.

The ISP is configured to process data fed back by the camera lens 193. For example, during shooting, a shutter is enabled, light is transmitted to a camera lens photosensitive element through a lens, an optical signal is converted into an electrical signal, and the camera lens photosensitive element transmits the electrical signal to the ISP for processing, to convert the electrical signal into an image or a video visible to a naked eye. The ISP may further perform algorithm optimization on noise, brightness, and complexion of the image. The ISP may further optimize parameters such as exposure and a color temperature of a shooting scene. In some embodiments, the ISP may be disposed in the camera lens 193.

The camera lens 193 is configured to capture a still image or a video. An optical image of an object is generated through a lens, and is projected onto a photosensitive element. The photosensitive element may be a charge coupled device (CCD) or a complementary metal-oxide-semiconductor (CMOS) phototransistor. The photosensitive element converts an optical signal into an electrical signal, and then transfers the electrical signal to the ISP. The ISP converts the electrical signal into a digital image or video signal. The ISP outputs the digital image or video signal to the DSP for processing. The DSP converts the digital image or video signal into an image or video signal in a standard format, for example, RGB or YUV.

In some embodiments, the electronic device may include one or N camera lenses 193, where N is a positive integer greater than 1. For example, in some embodiments, the electronic device may obtain images with a plurality of exposure coefficients by using N camera lenses 193, and then in post processing, the electronic device may synthesize, based on images with the plurality of exposure parameters, an HDR image by using an HDR technology:

The digital signal processor is configured to process a digital signal. In addition to processing a digital image or video signal, the digital signal processor may further process another digital signal.

The video codec is configured to compress or decompress a digital video. The electronic device may support one or more types of video codecs. In this way, the electronic device may play or record videos in a plurality of coding formats, for example, moving picture experts group (Moving Picture Experts Group, MPEG-1, MPEG-2, MPEG-3, and MPEG-4.

The external memory interface 120 may be configured to connect to an external storage card, for example, a micro-SD card, to extend a storage capability of the electronic device. The internal memory 121 may be configured to store computer-executable program code. The executable program code includes instructions. The processor 110 runs the instructions stored in the internal memory 121, to perform various function applications and data processing of the electronic device.

The electronic device may implement audio functions by using the audio module 170, the speaker 170A, the receiver 170B, the microphone 170C, the headset jack 170D, the application processor, and the like, such as music playing and audio recording.

The sensor module 180 may include one or more sensors, which may be of a same type or different types. It may be understood that the sensor module 180 shown in FIG. 7 is merely an example division manner, and there may be another division manner. This is not limited in this application.

The pressure sensor 180A is configured to sense a pressure signal, and may convert the pressure signal into an electrical signal. In some embodiments, the pressure sensor 180A may be disposed on the display 194. When a touch operation is performed on the display 194, the electronic device detects a strength of the touch operation by using the pressure sensor 180A. The electronic device may also calculate a touch location based on a detection signal of the pressure sensor 180A. In some embodiments, touch operations that are performed at a same touch position but have different touch operation intensity may correspond to different operation instructions.

The gyro sensor 180B may be configured to determine a movement posture of the electronic device. In some embodiments, an angular velocity of the electronic device around three axes (namely; an x axis, a y axis, and a z axis) may be determined by using the gyro sensor 180B. The gyro sensor 180B may be configured to implement image stabilization during shooting.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor 180K may be alternatively disposed on a surface of the electronic device, which is different from the position of the display 194.

A software structure of the electronic device may use a layered architecture, an event-driven architecture, a microkernel architecture, a microservice architecture, or a cloud architecture.

Figure 8:
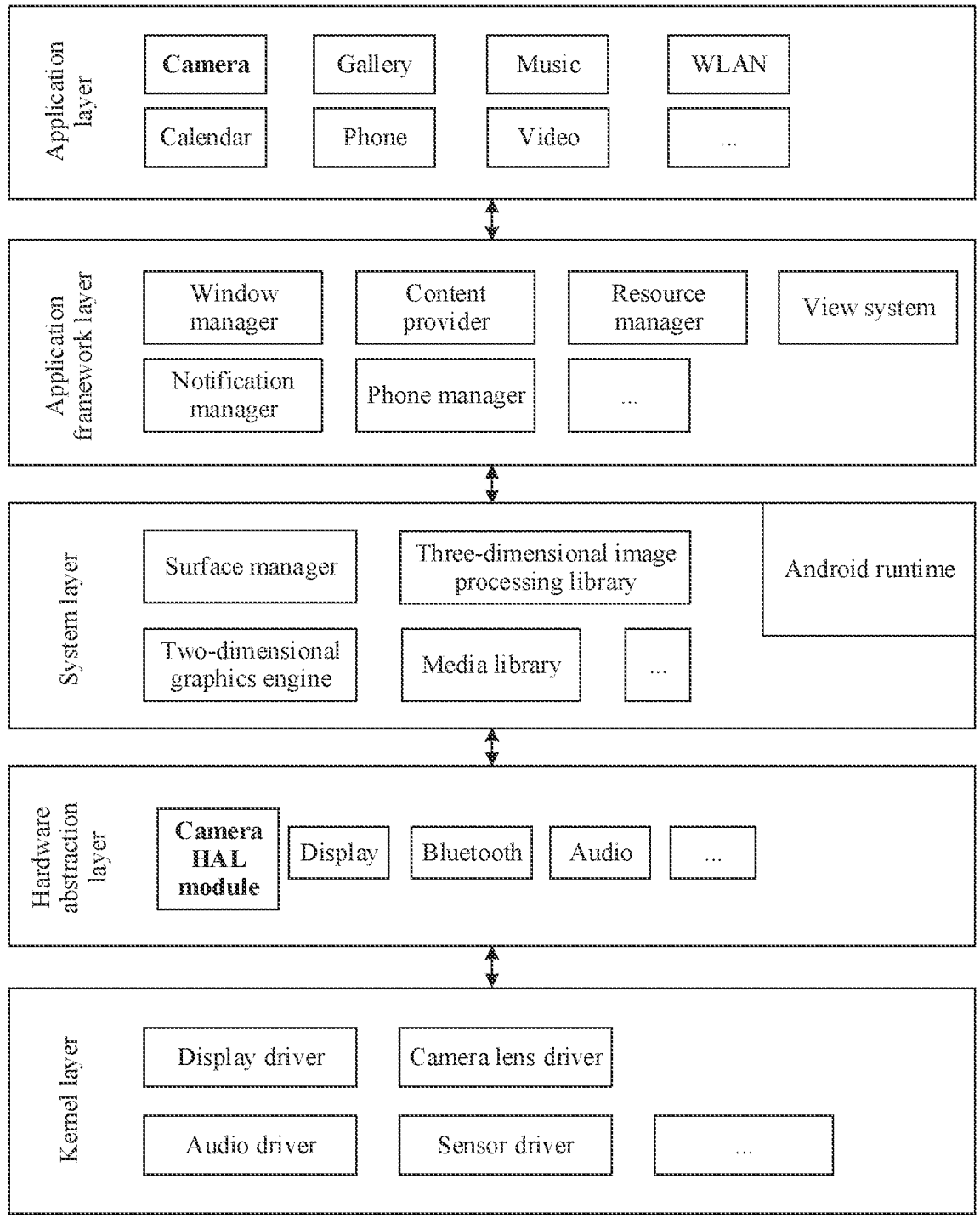
FIG. 8 is a schematic diagram of a software structure of an electronic device according to an embodiment of this application.

FIG. 8 is a schematic diagram of a software structure of an electronic device according to an embodiment of this application.

As shown in FIG. 8, a software framework of the electronic device involved in this application may include an application layer, an application framework layer (FWK), a system library; an Android runtime, a hardware abstraction layer, and a kernel layer.

The application layer may include a series of application packages, such as a camera, a gallery, a calendar, a phone, WLAN, music, a video, and other application programs (also referred to as applications). The camera is configured to capture an image and a video. For other applications of the application layer, reference may be made description and explanation in conventional technologies, which is not described in this application. In this application, an application on the electronic device may be a native application (for example, an application installed in the electronic device when an operating system is installed before the electronic device is delivered from a factory), or may be a third-party application (for example, an application downloaded and installed by a user by using an AppGallery). This is not limited in this embodiment of this application.

The application framework layer provides an application programming interface (Application Programming Interface, API) and a programming framework for an application on the application layer. The application framework layer includes some predefined functions.

As shown in FIG. 8, the application framework layer may include a window manager, a content provider, a view system, a phone manager, a resource manager, a notification manager, and the like.

The window manager is configured to manage a window program. The window manager may obtain a size of a display, determine whether there is a state bar, perform screen locking, take a screenshot, and the like.

The content provider is configured to: store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying a picture. The view system may be configured to construct an application. A display user interface may include one or more views. For example, a display user interface including a message notification icon may include a view for displaying text and a view for displaying pictures.

The phone manager is configured to provide a communication function of the electronic device, for example, management of a call state (including answering, declining, or the like).

The resource manager provides various resources such as a localized character string, an icon, a picture, a layout file, and a video file for an application.

The notification manager enables an application to display notification information in a state bar, and may be configured to convey a notification message that may automatically disappear after a short pause without requiring user interaction. For example, the notification manager is used for notifying download completion or as a message reminder. The notification manager may alternatively be a notification that appears on a top state bar of the system in a form of a graph or a scroll bar text, for example, a notification of an application running on the background, or may be a notification that appears on the screen in a form of a dialog user interface. For example, text information is displayed in the state bar, a prompt tone is made, the electronic device vibrates, or the indicator light flashes.

The runtime (runtime) includes a core library and a virtual machine. The runtime is responsible for scheduling and management of the system.

The core library includes two parts: a performance function that needs to be invoked by a programming language (for example, java language), and a system core library:

The application layer and the application framework layer run on the virtual machine. The virtual machine executes programming files (for example, Java files) of the application layer and the application framework layer as binary files. The virtual machine is configured to implement functions such as object lifecycle management, stack management, thread management, security and exception management, and garbage collection.

The system library may include a plurality of functional modules, for example, a surface manager (Surface Manager), a media library (Media Libraries), a three-dimensional graphics processing library (for example, OpenGL ES), and a two-dimensional graphics engine (for example, SGL).

The surface manager is configured to manage a display subsystem, and provide fusion of two dimensional (2-Dimensional, 2D) and three-dimensional (3-Dimensional, 3D) layers to a plurality of applications.

The media library supports playback and recording in a plurality of commonly used audio and video formats, and static image files. The media libraries may support a variety of audio and video encoding formats, such as MPEG-4, H.264, MP3, AAC, AMR, JPG, and PNG.

The three-dimensional graphics processing library is used for implementing 3D graphics drawing, image rendering, composition, layer processing, and the like.

The 2D graphics engine is a drawing engine for 2D drawing.

The hardware abstraction layer (HAL) is an interface layer between an operating system kernel and an upper layer of software, and is intended to abstract hardware. The hardware abstraction layer is an abstraction interface driven by a device kernel, and is configured to provide an application programming interface for a higher-level Java API framework to access an underlying device. The HAL includes a plurality of library modules, such as a camera HAL module, a display, Bluetooth, and audio. Each library module implements one interface for a specific type of hardware component. When the system framework layer API requires access to the hardware of the portable device, the Android operating system loads the library module for the hardware component.

The kernel layer is a foundation of the Android operating system, and a final function of the Android operating system is implemented by using the kernel layer. The kernel layer includes at least a display drive, a camera lens drive, an audio drive, a sensor drive, and a virtual card drive.

It should be noted that the schematic diagram of the software structure of the electronic device shown in FIG. 8 provided in this application is only an example, and does not limit specific module division in different layers of the Android operating system. For details, refer to the description of the software structure of the Android operating system in conventional technologies. In addition, the shooting method provided in this application may also be implemented based on another operating system, which is not listed one by one in this application.

The following embodiment takes the software structure of the electronic device shown in FIG. 8 as an example, to specifically describe the technical solution provided in this embodiment of this application.

Figure 9:
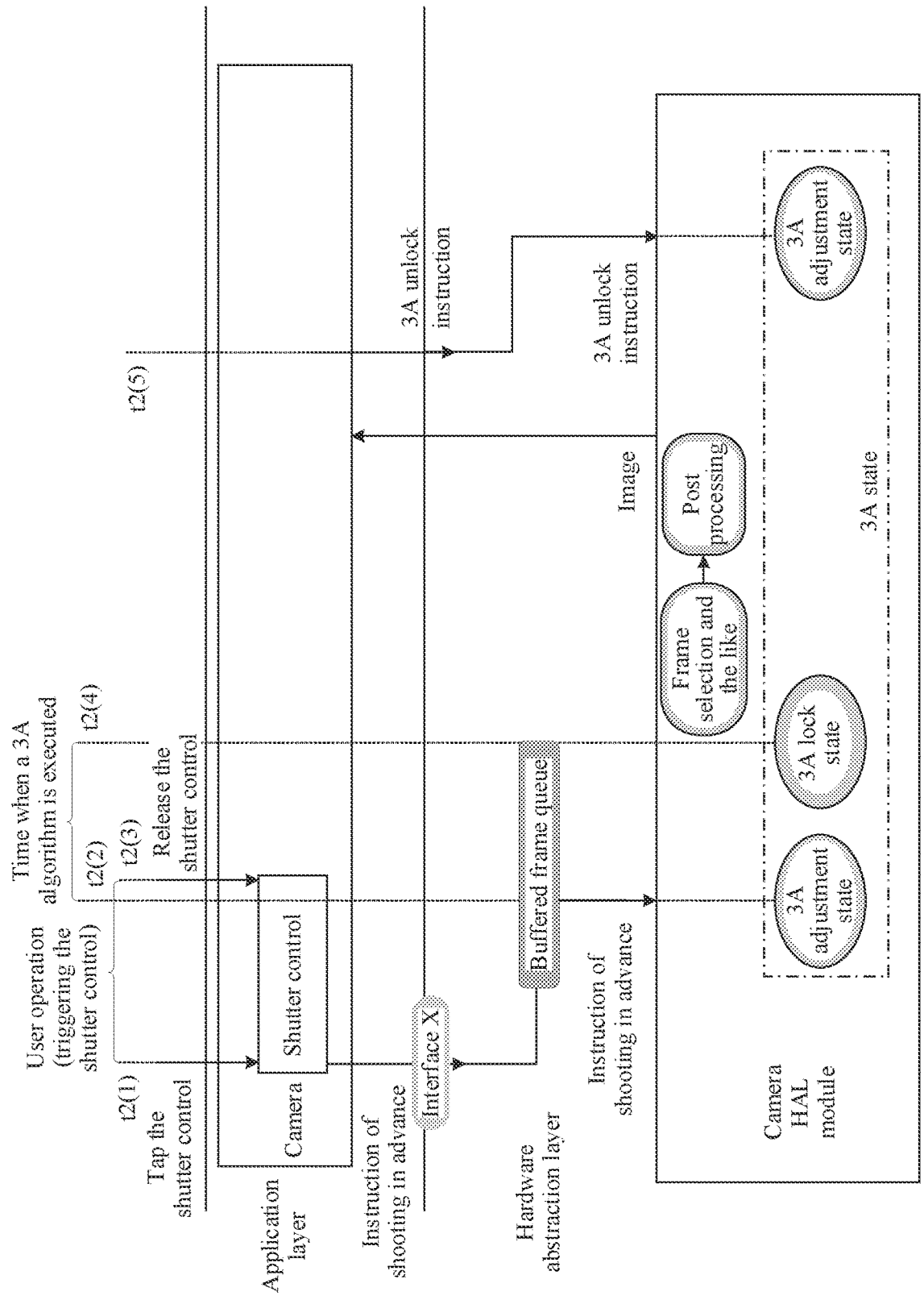
FIG. 9 is a schematic diagram of a shooting method according to an embodiment of this application.

FIG. 9 is a schematic diagram of a shooting method according to an embodiment of this application.

As shown in FIG. 9, an electronic device may include a camera application. A shooting user interface of the camera application includes a shutter control. The electronic device may detect that a user taps the shutter control. In response to the operation of tapping the shutter control, the camera application in the electronic device generates an instruction of shooting in advance, and sends the instruction of shooting in advance to a HAL layer through an interface X. The camera HAL module in the HAL layer in the electronic device may determine a current 3A state after receiving the instruction of shooting in advance. If the current 3A state is a 3A adjustment state, it indicates that a 3A algorithm does not converge. Once the 3A state is a 3A lock state, it indicates that the 3A algorithm has converged and the camera HAL module has obtained and locked an ideal shooting parameter. In this case, the camera HAL module may perform operations such as frame selection and post processing. It may be understood that an image obtained by post processing is an image obtained by shooting this time. The camera HAL module may upload the image to the camera application. The electronic device may store the image to the gallery application. Then the camera application in the electronic device may generate a 3A unlock instruction and send the 3A unlock instruction to the HAL layer. After receiving the 3A unlock instruction, the camera HAL module may adjust the 3A state to the 3A adjustment state.

It may be understood that, in the foregoing process, when the user taps the shutter control, the camera application may send the instruction of shooting in advance to trigger a shooting process. This reduces a time between a time point at which the user taps the shutter control and a time point at which the user releases the shutter control, and reduces some of a time for which the camera application interacts with the camera HAL module. If the 3A state is the 3A lock state, the camera HAL module may send a variable exposure shooting parameter in advance. This reduces a time for which an image is obtained based on a shooting parameter to be sent before the variable exposure shooting parameter. In addition, after the variable exposure shooting parameter is sent in advance, a time point at which a variable exposure frame is generated is changed to enable the variable exposure frame to be generated in advance. A time difference between the time at which a variable exposure frame is generated and a time point at which N frames of images are selected from a buffered frame queue are shortened, better facilitating subsequent fusion, and obtaining an image with higher quality. In addition, the camera HAL module may select an image from the buffered frame queue based on address information, without copying the image. This reduces a copying time and computing resources. Moreover, the camera HAL module may further determine definition of the image based on a jitter amount and sharpness information of each row of pixels of the image more accurately.

The foregoing embodiments are merely intended for describing the technical solutions of this application, but not for limiting this application. Although this application is described in detail with reference to the foregoing embodiments, persons of ordinary skill in the art should understand that the persons of ordinary skill may still make modifications to the technical solutions described in the foregoing embodiments or make equivalent replacements to some technical features thereof, without departing from the scope of the technical solutions of embodiments of this application.

What is claimed is:

1. A method, comprising:
    displaying a first user interface comprising a shutter control, wherein the first user interface is a shooting user interface of a camera application;
    generating an instruction of shooting in advance in response to an operation of tapping the shutter control; and
    obtaining an image frame if a current 3A state is a 3A lock state, wherein the current 3A state is based on the instruction of shooting in advance, wherein the 3A state indicates a performing progress of the 3A algorithm, wherein the 3A lock state indicates that the 3A algorithm has converged, and wherein obtaining the image frame further comprises:
        selecting N frames of images from a buffered frame queue based on a first time point, a jitter amount, and a sharpness of the images in the buffered frame queue, wherein the first time point is a time point at which the operation of tapping the shutter control is detected, wherein the buffered frame queue stores an image captured by a camera lens, wherein the N frames of images are original RAW images, and wherein N is a positive integer; and
        performing post processing on the N frames of images to obtain the image frame,
    wherein before performing post processing on the N frames of images, the method further comprises:

sending a variable exposure shooting parameter to the camera lens by a camera hardware abstraction layer (HAL) module before sending a to-be-sent shooting parameter; and capturing a group of variable exposure frames based on the variable exposure shooting parameter by the camera lens, wherein the to-be-sent shooting parameter is a shooting parameter obtained by the camera HAL module before obtaining the variable exposure shooting parameter and has not yet been sent to the camera lens, wherein the variable exposure shooting parameter comprises exposure parameters corresponding to the group of variable exposure frames, and wherein an exposure time corresponding to a first image in the group of variable exposure frames is different than an exposure time corresponding to a second image in the group of variable exposure frames, wherein performing post processing on the N frames of images comprises fusing the N frames of images with the group of variable exposure frames.

2. The method of claim 1, wherein after generating the instruction of shooting in advance, the method further comprises sending the instruction of shooting in advance to an HAL by the camera application based on a first interface, wherein the first interface is a custom interface.

3. The method of claim 1, wherein before performing post processing on the N frames of images, the method further comprises:
adding address information to the images in the buffered frame queue;
recording address information corresponding to the N frames of images, and adding 1 to a reference count corresponding to the N frames of images, wherein the reference count is a quantity of times for which the corresponding images are to be invoked or are being invoked, and wherein the images that are to be invoked or are being invoked for times not equal to 0 are not eliminated after being moved out of the buffered frame queue; and
obtaining the N frames of images based on the address information corresponding to the N frames of images.

4. The method of claim 1, wherein the group of variable exposure frames comprises a short exposure frame, a medium exposure frame, and a long exposure frame, wherein an exposure time corresponding to the short exposure frame is less than an exposure time corresponding to the medium exposure frame, and wherein an exposure time corresponding to the medium exposure frame is less than an exposure time corresponding to the long exposure frame.

5. The method of claim 1, wherein after generating the instruction of shooting in advance by the camera application, the method further comprises detecting an operation of shutter releasing.

6. The method of claim 1, wherein after obtaining the image frame, the method further comprises displaying a second user interface that comprises a gallery shortcut control, wherein the gallery shortcut control displays a thumbnail of the image frame.

7. An electronic device, comprising:
one or more processors;
a display coupled to the one or more processors; and
one or more memories coupled to the one or more processors, wherein the memory is configured to store instructions that, when executed by the processor, cause the electronic device to be configured to:

display a first user interface comprising a shutter control, wherein the first user interface is a shooting user interface of a camera application;
generate an instruction of shooting in advance in response to an operation of tapping the shutter control; and
obtain an image frame if a current 3A state is a 3A lock state, wherein the current 3A state is based on the instruction of shooting in advance, wherein the 3A state indicates a performing progress of the 3A algorithm, wherein the 3A lock state indicates that the 3A algorithm has converged, and wherein obtaining the image frame further comprises:
selecting N frames of images from a buffered frame queue based on a first time point, a jitter amount, and a sharpness of the images in the buffered frame queue, wherein the first time point is a time point at which the operation of tapping the shutter control is detected, wherein the buffered frame queue stores an image captured by a camera lens, wherein the N frames of images are original RAW images, and wherein N is a positive integer; and
performing post processing on the N frames of images to obtain the image frame,
wherein before performing post processing on the N frames of images, the electronic device is further configured to:
send a variable exposure shooting parameter to the camera lens by a camera hardware abstraction layer (HAL) module before sending a to-be-sent shooting parameter; and
capture a group of variable exposure frames based on the variable exposure shooting parameter by the camera lens, wherein the to-be-sent shooting parameter is a shooting parameter obtained by the camera HAL module before obtaining the variable exposure shooting parameter and has not yet been sent to the camera lens, wherein the variable exposure shooting parameter comprises exposure parameters corresponding to the group of variable exposure frames, and wherein an exposure time corresponding to a first image in the group of variable exposure frames is different than an exposure time corresponding to a second image in the group of variable exposure frames,
wherein performing post processing on the N frames of images comprises fusing the N frames of images with the group of variable exposure frames.

8. A non-transitory computer-readable storage medium, comprising instructions that, when executed by one or more processors of an electronic device, cause the electronic device to be configured to:
display a first user interface comprising a shutter control, wherein the first user interface is a shooting user interface of a camera application;
generate an instruction of shooting in advance in response to an operation of tapping the shutter control; and
obtain an image frame if a current 3A state is a 3A lock state, wherein the current 3A state is based on the instruction of shooting in advance, wherein the 3A state indicates a performing progress of the 3A algorithm, wherein the 3A lock state indicates that the 3A algorithm has converged, and wherein obtaining the image frame further comprises:
selecting N frames of images from a buffered frame queue based on a first time point, a jitter amount, and a sharpness of the images in the buffered frame queue, wherein the first time point is a time point at which the operation of tapping the shutter control is detected, wherein the buffered frame queue stores an image captured by a camera lens, wherein the N frames of images are original RAW images, and wherein N is a positive integer; and performing post processing on the N frames of images to obtain the image frame, wherein before performing post processing on the N frames of images, the electronic device is further configured to:

add address information to the images in the buffered frame queue;

record address information corresponding to the N frames of images, and adding 1 to a reference count corresponding to the N frames of images, wherein the reference count is a quantity of times for which the corresponding images are to be invoked or are being invoked, and wherein the images that are to be invoked or are being invoked for times not equal to 0 are not eliminated after being moved out of the buffered frame queue; and obtain the N frames of images based on the address information corresponding to the N frames of images.

9. The electronic device of claim 7, wherein after generating the instruction of shooting in advance, the instructions, when executed by the one or more processors, further cause the electronic device to be configured to send the instruction of shooting in advance to an HAL by the camera application based on a first interface, wherein the first interface is a custom interface.

10. The electronic device of claim 7, wherein the group of variable exposure frames comprises a short exposure frame, a medium exposure frame, and a long exposure frame, wherein an exposure time corresponding to the short exposure frame is less than an exposure time corresponding to the medium exposure frame, and wherein an exposure time corresponding to the medium exposure frame is less than an exposure time corresponding to the long exposure frame.

11. The electronic device of claim 7, wherein before performing post processing on the N frames of images, the instructions, when executed by the one or more processors, further cause the electronic device to be configured to:

add address information to the images in the buffered frame queue;

record address information corresponding to the N frames of images, and add 1 to a reference count corresponding to the N frames of images, wherein the reference count is a quantity of times for which the corresponding images are to be invoked or are being invoked, and wherein the images that are to be invoked or are being invoked for times not equal to 0 are not eliminated after being moved out of the buffered frame queue; and obtain the N frames of images based on the address information corresponding to the N frames of images.

12. The electronic device of claim 7, wherein after generating the instruction of shooting in advance by the camera application, the instructions, when executed by the one or more processors, further cause the electronic device to be configured to detect an operation of shutter releasing.

13. The electronic device of claim 7, wherein after obtaining the image frame, the instructions, when executed by the one or more processors, further cause the electronic device to be configured to display a second user interface that comprises a gallery shortcut control, wherein the gallery shortcut control displays a thumbnail of the image frame.

14. The non-transitory computer-readable storage medium of claim 8, wherein after generating the instruction of shooting in advance, the instructions, when executed by the one or more processors, further cause the electronic device to be configured to send the instruction of shooting in advance to an HAL by the camera application based on a first interface, wherein the first interface is a custom interface.

15. The non-transitory computer-readable storage medium of claim 8, wherein before performing post processing on the N frames of images, the instructions, when executed by the one or re processors, further cause the electronic device to be configured to:

send a variable exposure shooting parameter to the camera lens by a camera HAL module before sending a to-be-sent shooting parameter; and capture a group of variable exposure frames based on the variable exposure shooting parameter by the camera lens, wherein the to-be-sent shooting parameter is a shooting parameter obtained by the camera HAL module before obtaining the variable exposure shooting parameter and has not yet been sent to the camera lens, wherein the variable exposure shooting parameter comprises exposure parameters corresponding to the group of variable exposure frames, and wherein an exposure time corresponding to a first image in the group of variable exposure frames is different than an exposure time corresponding to a second image in the group of variable exposure frames, wherein performing post processing on the N frames of images comprises fusing the N frames of images with the group of variable exposure frames.

16. The non-transitory computer-readable storage medium of claim 15, wherein the group of variable exposure frames comprises a short exposure frame, a medium exposure frame, and a long exposure frame, wherein an exposure time corresponding to the short exposure frame is less than an exposure time corresponding to the medium exposure frame, and wherein an exposure time corresponding to the medium exposure frame is less than an exposure time corresponding to the long exposure frame.

17. The non-transitory computer-readable storage medium of claim 8, wherein after generating the instruction of shooting in advance by the camera application, the electronic device is further configured to detect an operation of shutter releasing.

18. The non-transitory computer-readable storage medium of claim 8, wherein after obtaining the image frame, the electronic device is further configured to display a second user interface that comprises a gallery shortcut control, wherein the gallery shortcut control displays a thumbnail of the image frame.

19. The method of claim 1, wherein the instruction is generated without receiving state prompt information indicating convergence of an auto focus, auto exposure, and auto white balance (3A) algorithm.

20. The electronic device of claim 7, wherein the instruction is generated without receiving state prompt information indicating convergence of an auto focus, auto exposure, and auto white balance (3A) algorithm.

* * * * *